United States Patent [19]
Gottsman et al.

[11] Patent Number: 6,134,548
[45] Date of Patent: Oct. 17, 2000

[54] SYSTEM, METHOD AND ARTICLE OF MANUFACTURE FOR ADVANCED MOBILE BARGAIN SHOPPING

[75] Inventors: Edward Gottsman, Evanston; Adam Brody, Chicago, both of Ill.

[73] Assignee: AC Properties B.V., S'Gravenhage, Netherlands

[21] Appl. No.: 09/196,339

[22] Filed: Nov. 19, 1998

[51] Int. Cl.$^7$ ................................................ G06F 17/30
[52] U.S. Cl. .................................... 707/5; 707/3; 707/10; 705/26; 709/217; 709/249; 235/462; 235/472
[58] Field of Search ................................. 707/3, 4, 10, 5, 707/7; 235/472, 462; 705/26; 709/249, 217

[56] References Cited

U.S. PATENT DOCUMENTS

| | | | |
|---|---|---|---|
| 5,279,882 | 1/1994 | Daude et al. | 428/192 |
| 5,519,608 | 5/1996 | Kupiec | 364/419.08 |
| 5,606,602 | 2/1997 | Johnson et al. | 379/115 |

(List continued on next page.)

FOREIGN PATENT DOCUMENTS

| | | |
|---|---|---|
| 0 651 531 A2 | 5/1995 | European Pat. Off. . |
| 0 856 812 A2 | 8/1998 | European Pat. Off. . |
| 0883313 A2 | 12/1998 | European Pat. Off. . |
| 0890907 A1 | 1/1999 | European Pat. Off. . |
| 10171758 | 6/1998 | Japan . |
| 10177613 | 6/1998 | Japan . |
| WO 97/17815 | 5/1997 | WIPO . |
| WO/97/40451 | 10/1997 | WIPO . |
| WO 97/45814 | 12/1997 | WIPO . |
| WO 98/03923 | 1/1998 | WIPO . |
| WO 98/06055 | 2/1998 | WIPO . |
| WO 98/10541 | 3/1998 | WIPO . |
| WO 98/11744 | 3/1998 | WIPO . |
| WO 98/12833 | 3/1998 | WIPO . |
| WO 98/24036 | 6/1998 | WIPO . |
| WO 98/24050 | 6/1998 | WIPO . |
| WO 98/39909 | 9/1998 | WIPO . |
| WO 98/40823 | 9/1998 | WIPO . |
| WO 98/49813 | 11/1998 | WIPO . |
| WO 98/52371 | 11/1998 | WIPO . |
| WO 98/57474 | 12/1998 | WIPO . |
| WO 98/58476 | 12/1998 | WIPO . |
| WO 99/01969 | 1/1999 | WIPO . |

OTHER PUBLICATIONS

Chu–Sing Yang, Kun–da Wu, Chun–Wei Tseng; Support an Efficient Connection for Mobile IP; Proceedings, Ninth International Workshop on Database and Expert Systems Applications; Aug. 1998, IEE, Computer Society, pp. 514–519.

Mary Carmen Cupito; Emerging technologies: Has Their time come? Enterprise Integration; Health Management Technology; Dec. 1998, pp. 12–16.

Toh Han Shih; Online life–line; Wired for Business; Singapore Business Times; Dec. 1998, p. 1.

Chris Bradley; Remote and Mobile Computing Wigh TCP/IP; Enterprise Systems Journal; Jan. 1998, pp. 38–48.

(List continued on next page.)

*Primary Examiner*—Jean R. Homere
*Attorney, Agent, or Firm*—Hickman Stephens Coleman & Hughes, LLP

[57] ABSTRACT

A system is disclosed that facilitates web-based comparison shopping in conventional, physical, non-web retail environments. A wireless phone or similar hand-held wireless device with Internet Protocol capability is combined with a miniature barcode reader (installed either inside the phone or on a short cable) and utilized to obtain definitive product identification by, for example, scanning a Universal Product Code (UPC) bar code from a book or other product. The wireless device transmits the definitive product identifier to a service routine (running on a Web server), which converts it to (in the case of books) its International Standard Book Number or (in the case of other products) whatever identifier is appropriate. The service routine then queries the Web to find price, shipping and availability information on the product from various Web suppliers. This information is formatted and displayed on the hand-held device's screen. The user may then use the hand-held device to place an order interactively.

17 Claims, 27 Drawing Sheets

U.S. PATENT DOCUMENTS

| | | | |
|---|---|---|---|
| 5,640,193 | 6/1997 | Wellner | 348/7 |
| 5,673,322 | 9/1997 | Pepe et al. | 389/49 |
| 5,721,421 | 2/1998 | VanDonkelaar | 235/462 |
| 5,732,074 | 3/1998 | Spaur et al. | 370/313 |
| 5,854,624 | 12/1998 | Grant | 345/169 |
| 5,913,210 | 6/1999 | Call | 707/4 |
| 5,938,727 | 8/1999 | Ikeda | 709/218 |
| 5,950,173 | 9/1999 | Perkowski | 705/26 |
| 5,971,277 | 10/1999 | Cragun et al. | 235/462.01 |
| 5,978,773 | 11/1999 | Hudetz et al. | 705/23 |
| 5,979,757 | 11/1999 | Tracy et al. | 235/383 |
| 5,992,752 | 11/1999 | Wilz, Sr. et al. | 235/472.01 |

OTHER PUBLICATIONS

Enhanced Services: Telecom customers will soon have one–stop, easy–to–use access to their services portfolio form anywhere, at any time, and in any way; Edge, on & about AT&T; May 1997, pp. 1–2, Anonymous.

Bob Emmerson; The Mobile Intranet: The next generation of GSM services will offer faster data rates and smarter messaging; May 1998; Byte Magazine, pp. 1–7.

Timo Alanko, Markku Kojo, Mika Liljeberg; Mobile access to the Internet; a mediator–based solution; Internet Research; Electronis Networking Applications and Policy vol. 9, No. 1, pp. 58–65, 1999.

Andrezej Duda, Stephane Perret; A Network Programming Model for Mobile Applications and Information Access; Proceedings JENC7, pp. 141.1–141.9, No Date.

Nokia, Ericsson, Unwired Planet and Motorola unite to create an open common protocol for interactive wireless applications; Jun. 26, 1997, pp. 1–3.

Unisource in GSM trial of mobile electronic banking and shopping; Mobile Communications; Mar. 20, 1997, 1–3, Anonymous.

Dynamic Mobile Data Announces Mobile Server Wireless Solution For Enterprise and internet Access; Mar. 1999, pp. 1–2, Anonymous.

Philip R. Cohen, Adam Cheyer, Michelle Wang, Soon Cheol Baeg; An Open Agent Architecture; Software Agent Papers, AAAI Spring Symposium 1994, pp. 1–129.

Katia Sycara, Anandeep S. Pannu; The RETSINA Multi–agent System: Towards Integrating Planning, Execution and Information Gathering; Proceedings of the Second International Conference on Autonomous Agents, May 1998, pp. 350–351.

FIG. 23

SYSTEM, METHOD AND ARTICLE OF MANUFACTURE FOR ADVANCED MOBILE BARGAIN SHOPPING

FIELD OF THE INVENTION

The present invention relates to agent based systems and more particularly to a mobile computing environment and more particularly to a mobile computing environment that accesses the Internet to obtain product information for a user.

Agent based technology has become increasingly important for use with applications designed to interact with a user for performing various computer based tasks in foreground and background modes. Agent software comprises computer programs that are set on behalf of users to perform routine, tedious and time-consuming tasks. To be useful to an individual user, an agent must be personalized to the individual user's goals, habits and preferences. Thus, there exists a substantial requirement for the agent to efficiently and effectively acquire user-specific knowledge from the user and utilize it to perform tasks on behalf of the user.

The concept of agency, or the user of agents, is well established. An agent is a person authorized by another person, typically referred to as a principal, to act on behalf of the principal. In this manner the principal empowers the agent to perform any of the tasks that the principal is unwilling or unable to perform. For example, an insurance agent may handle all of the insurance requirements for a principal, or a talent agent may act on behalf of a performer to arrange concert dates.

With the advent of the computer, a new domain for employing agents has arrived. Significant advances in the realm of expert systems enable computer programs to act on behalf of computer users to perform routine, tedious and other time-consuming tasks. These computer programs are referred to as "software agents."

Moreover, there has been a recent proliferation of computer and communication networks. These networks permit a user to access vast amounts of information and services without, essentially, any geographical boundaries. Thus, a software agent has a rich environment to perform a large number of tasks on behalf of a user. For example, it is now possible for an agent to make an airline reservation, purchase the ticket, and have the ticket delivered directly to a user. Similarly, an agent could scan the Internet and obtain information ranging from the latest sports or news to a particular graduate thesis in applied physics. Current solutions fail to apply agent technology to existing calendar technology to provide targeted acquisition of background information for a user's upcoming events.

SUMMARY OF THE INVENTION

According to a broad aspect of a preferred embodiment of the invention, A system is disclosed that facilitates web-based comparison shopping in conventional, physical, non-web retail environments. A wireless phone or similar hand-held wireless device with Internet Protocol capability is combined with a miniature barcode reader (installed either inside the phone or on a short cable) and utilized to obtain definitive product identification by, for example, scanning a Universal Product Code (UPC) bar code from a book or other product. The wireless device transmits the definitive product identifier to a service routine (running on a Web server), which converts it to (in the case of books) its International Standard Book Number or (in the case of other products) whatever identifier is appropriate. The service routine then queries the Web to find price, shipping and availability information on the product from various Web suppliers. This information is formatted and displayed on the hand-held device's screen. The user may then use the hand-held device to place an order interactively.

DESCRIPTION OF THE DRAWINGS

The foregoing and other objects, aspects and advantages are better understood from the following detailed description of a preferred embodiment of the invention with reference to the drawings, in which:

FIG. 23 illustrates an agent interaction display in accordance with a preferred embodiment;

DETAILED DESCRIPTION

Figure 1:
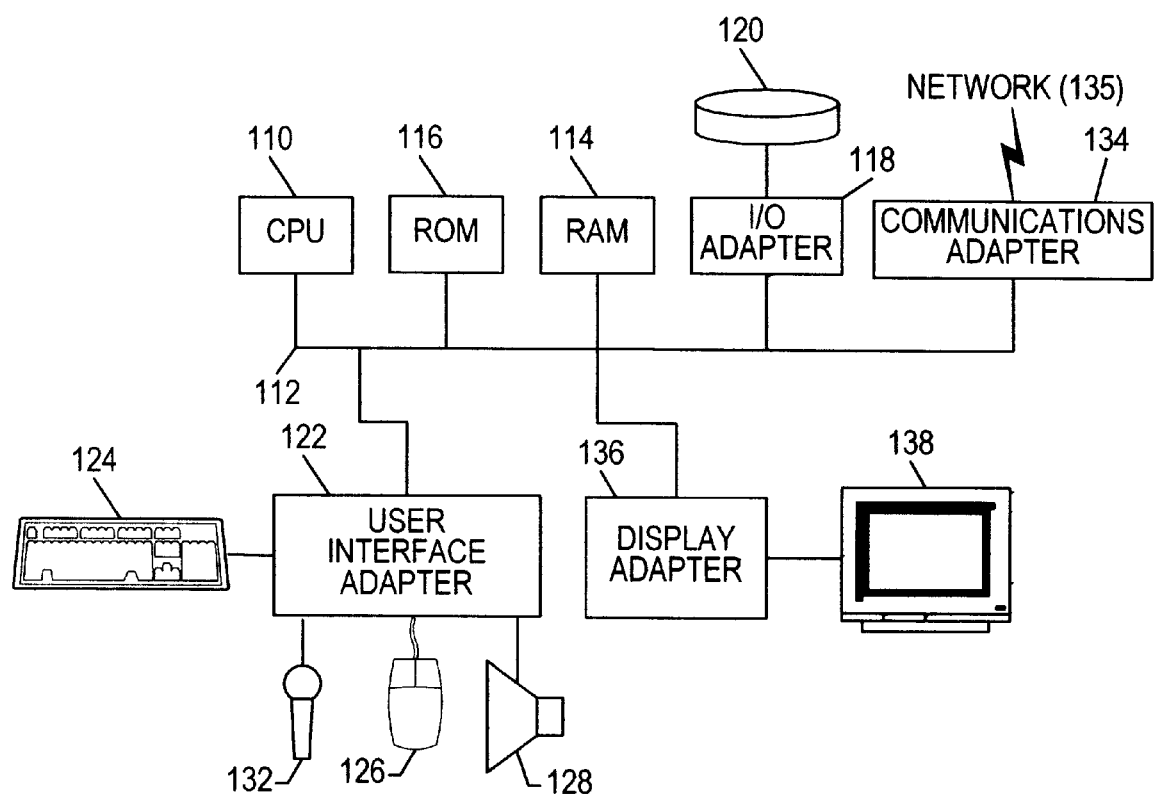
FIG. 1 is a block diagram of a representative hardware environment in accordance with a preferred embodiment.

A preferred embodiment of a system in accordance with the present invention is preferably practiced in the context of a personal computer such as an IBM compatible personal computer, Apple Macintosh computer or UNIX based workstation. A representative hardware environment is depicted in FIG. 1, which illustrates a typical hardware configuration of a workstation in accordance with a preferred embodiment having a central processing unit 110, such as a microprocessor, and a number of other units interconnected via a system bus 112. The workstation shown in FIG. 1 includes a Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 128, a microphone 132, and/or other user interface devices such as a touch screen (not shown) to the bus 112, communication adapter 134 for connecting the workstation to a communication network (e.g., a data processing network) and a display adapter 136 for connecting the bus 112 to a display device 138. The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on platforms and operating systems other than those mentioned.

A preferred embodiment is written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture.

It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, our logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built, objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, common lisp object system (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after being called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the Newco. HTTP or other protocols could be readily substituted for HTML without undue experimentation. Information on these products is available in T. Berners-Lee, D. Connoly, "RFC 1866: Hypertext Markup Language-2.0" (November 1995); and R. Fielding, H, Frystyk, T. Berners-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879:1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;

Restricted user interface capabilities;

Can only produce static Web pages;

Lack of interoperability with existing applications and data; and

Inability to scale.

Sun Microsystem's Java language solves many of the client-side problems by:

Improving performance on the client side;

Enabling the creation of dynamic, real-time Web applications; and

Providing the ability to create a wide variety of user interface components.

With Java, developers can create robust User Interface (UI) components. Custom "widgets" (e.g. real-time stock tickers, animated icons, etc.) can be created, and client-side performance is improved. Unlike HTML, Java supports the notion of client-side validation, off loading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g. simple animations, page adornments, basic games, etc.). Applets execute within a Java-compatible browser (e.g. Netscape Navigator) by copying code from the server to client. From a language standpoint, Java's core feature set is based on C++. Sun's Java literature states that Java is basically "C++, with extensions from Objective C for more dynamic method resolution".

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

In accordance with a preferred embodiment, Background-Finder (BF) is implemented as an agent responsible for preparing an individual for an upcoming meeting by helping him/her retrieve relevant information about the meeting from various sources. BF receives input text in character form indicative of the target meeting. The input text is generated in accordance with a preferred embodiment by a calendar program that includes the time of the meeting. As the time of the meeting approaches, the calendar program is queried to obtain the text of the target event and that information is utilized as input to the agent. Then, the agent parses the input meeting text to extract its various components such as title, body, participants, location, time etc. The system also performs pattern matching to identify particular meeting fields in a meeting text. This information is utilized to query various sources of information on the web and obtain relevant stories about the current meeting to send back to the calendaring system. For example, if an individual has a meeting with Netscape and Microsoft to talk about their disputes, and would obtain this initial information from the calendaring system. It will then parse out the text to realize that the companies in the meeting are "Netscape" and "Microsoft" and the topic is "disputes." Then, the system queries the web for relevant information concerning the topic. Thus, in accordance with an objective of the invention, the system updates the calendaring system and eventually the user with the best information it can gather to prepare the user for the target meeting. In accordance with a preferred embodiment, the information is stored in a file that is obtained via selection from a link imbedded in the calendar system.

PROGRAM ORGANIZATION

A computer program in accordance with a preferred embodiment is organized in five distinct modules: BF.Main, BF.Parse, Background Finder.Error, BF.PatternMatching and BF.Search. There is also a frmMain which provides a user interface used only for debugging purposes. The executable programs in accordance with a preferred embodiment never execute with the user interface and should only return to the calendaring system through Microsoft's Winsock control. A preferred embodiment of the system executes in two different modes which can be specified under the command line sent to it by the calendaring system. When the system runs in simple mode, it executes a keyword query to submit to external search engines. When executed in complex mode, the system performs pattern matching before it forms a query to be sent to a search engine.

DATA STRUCTURES

The system in accordance with a preferred embodiment utilizes three user defined structures:

1. TMeetingRecord;
2. TPatternElement; and
3. TPatternRecord.

The user-defined structure, tMeetingRecord, is used to store all the pertinent information concerning a single meeting. This info includes userID, an original description of the meeting, the extracted list of keywords from the title and body of meeting etc. It is important to note that only one meeting record is created per instance of the system in accordance with a preferred embodiment. This is because each time the system is spawned to service an upcoming meeting, it is assigned a task to retrieve information for only one meeting. Therefore, the meeting record created corresponds to the current meeting examined. ParseMeetingText populates this meeting record and it is then passed around to provide information about the meeting to other functions.

If GoPatternMatch can bind any values to a particular meeting field, the corresponding entries in the meeting record is also updated. The structure of tMeetingRecord with each field described in parentheses is provided below in accordance with a preferred embodiment.

A.1.1.1.1.1 Public Type tMeetingRecord sUserID As String (user id given by Munin)

sTitleOrig As String (original non stop listed title we need to keep around to send back to Munin)

sTitleKW As String (stoplisted title with only keywords)

sBodyKW As String (stoplisted body with only keywords)

sCompany( ) As String (companys identified in title or body through pattern matching)

sTopic( ) As String (topics identified in title or body through pattern matching)

sPeople( ) As String (people identified in title or body through pattern matching)

sWhen( ) As String (time identified in title or body through pattern matching)

sWhere( ) As String (location identified in title or body through pattern matching)

sLocation As String (location as passed in by Munin)

sTime As String (time as passed in by Munin)

sParticipants( ) As String (all participants engaged as passed in by Munin)

sMeetingText As String (the original meeting text w/o userid)

End Type

There are two other structures which are created to hold each individual pattern utilized in pattern matching. The record tAPatternRecord is an array containing all the components/elements of a pattern. The type tAPatternElement is an array of strings which represent an element in a pattern. Because there may be many "substitutes" for each element, we need an array of strings to keep track of what all the substitutes are. The structures of tAPatternElement and tAPatternRecord are presented below in accordance with a preferred embodiment.

```
Public Type tAPatternElement
    elementArray( ) As String
End Type
Public Type tAPatternRecord
    patternArray( ) As tAPatternElement
End Type
```

COMMON USER DEFINED CONSTANTS

Many constants are defined in each declaration section of the program which may need to be updated periodically as part of the process of maintaining the system in accordance with a preferred embodiment. The constants are accessible to allow dynamic configuration of the system to occur as updates for maintaining the code.

Included in the following tables are lists of constants from each module which I thought are most likely to be modified from time to time. However, there are also other constants used in the code not included in the following list. It does not mean that these non-included constants will never be changed. It means that they will change much less frequently.

For the Main Module (BF.Main):

| CONSTANT | PRESET VALUE | USE |
| --- | --- | --- |
| MSGTOMUNIN_TYPE | 6 | Define the message number used to identiy messages between BF and Munin |
| IP_ADDRESS_MUNIN | "10.2.100.48" | Define the IP address of the machine in which Munin and BF are running on so they can transfer data through UDP. |
| PORT_MUNIN | 7777 | Define the remote port in which we are operating on. |
| TIMEOUT_AV | 60 | Define constants for setting time out in inet controls |
| TIMEOUT_NP | 60 | Define constants for setting time out in inet controls |
| CMD_SEPARATOR | "/" | Define delimiter to tell which party of Munin's command represents the beginning of our input meeting text. |
| OUTPARAM_SEPARATOR | "::" | Define delimiter for separating out different portions of the output. The separator is for delimiting the msg type, the user id, the meeting title and the beginning of the actual stories retrieved. |

For the Search Module (BF.Search):

| CONSTANT | CURRENT VALUE | USE |
| --- | --- | --- |
| PAST_NDAYS | 5 | Define number of days you want to look back for AltaVista articles. Doesn't really matter now because we aren't really doing a news search in alta vista. We want all into. |
| CONNECTOR_AV_URL | "+AND+" | Define how to connect keywords. We want all our keywords in the string so for now use AND. If you want to do an OR or something, just change connector. |
| CONNECTOR_NP_URL | "+AND+" | Define how to connect keywords. We want all our keywords in the string so for now use AND. If you want to do an OR or something, just change connector. |
| NUM_NP_STORIES | 3 | Define the number of stories to return back to Munin from NewsPage. |
| NUM_AV_STORIES | 3 | Define the number of stories to return back to Munin from AltaVista. |

For the Parse Module (BF.Parse):

| CONSTANT | CURRENT VALUE | USE |
| --- | --- | --- |
| PORTION_SEPARATOR | "::" | Define the separator between different portions of the meeting text sent in by Munin. For example in "09::Meet with Chad:: about life::Chad \| Denise:::::::" "::" is the separator between different parts of the meeting text. |
| PARTICIPANT_SEPARATOR | "\|" | Define the separator between each participant in the participant list portion of the original meeting text. Refer to example above. |

For Pattern Matching Module (BFPatternMatch): There are no constants in this module which require frequent updates.

General Process Flow

Figure 2:
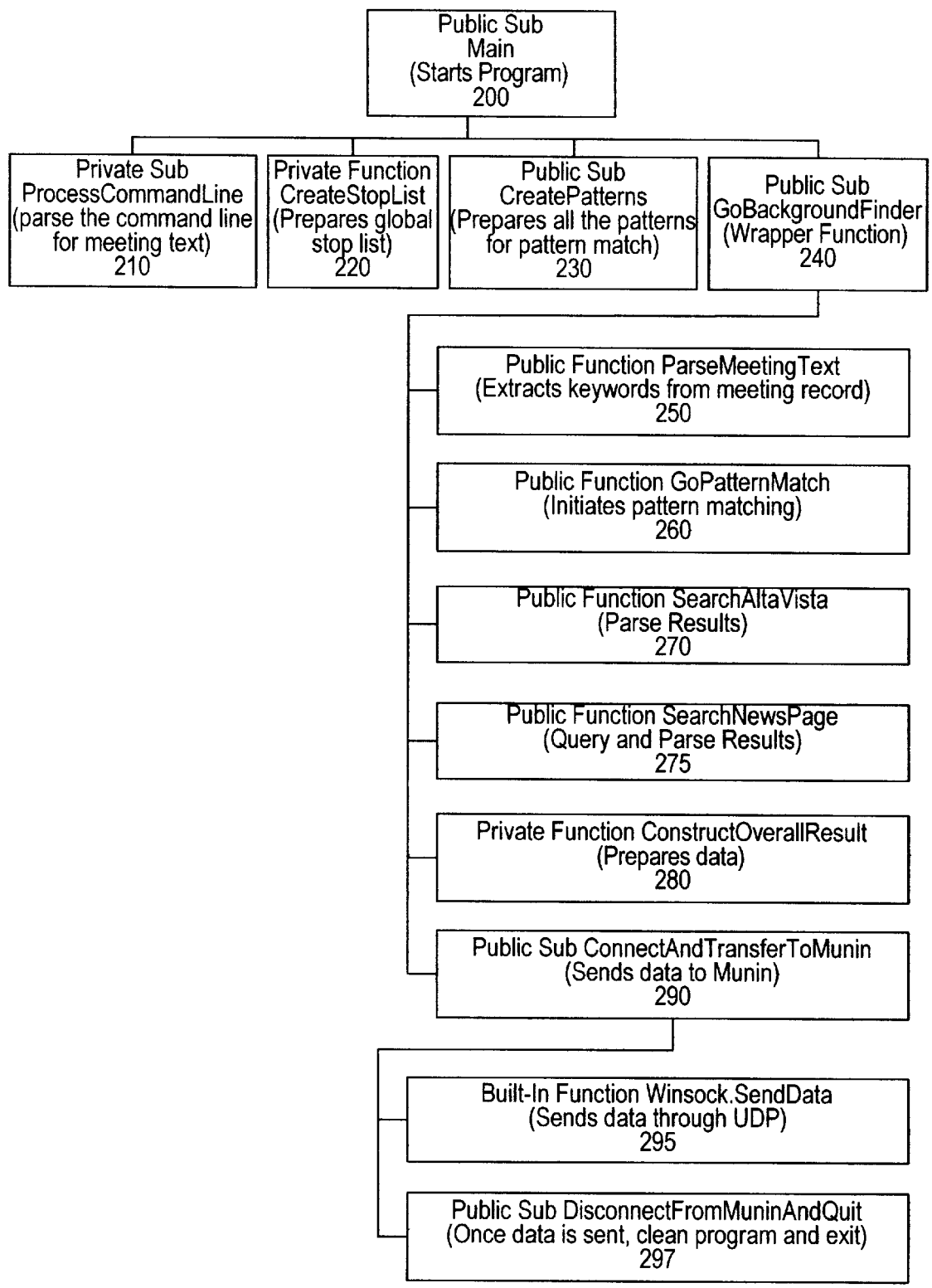
FIG. 2 is a flowchart of the system in accordance with a preferred embodiment.

The best way to depict the process flow and the coordination of functions between each other is with the five flowcharts illustrated in FIGS. 2 to 6. FIG. 2 depicts the overall process flow in accordance with a preferred embodiment. Processing commences at the top of the chart at function block 200 which launches when the program starts. Once the application is started, the command line is parsed to remove the appropriate meeting text to initiate the target of the background find operation in accordance with a preferred embodiment as shown in function block 210. A global stop list is generated after the target is determined as shown in function block 220. Then, all the patterns that are utilized for matching operations are generated as illustrated in function block 230. Then, by tracing through the chart, function block 200 invokes GoBF 240 which is responsible for logical processing associated with wrapping the correct search query information for the particular target search engine. For example, function block 240 flows to function block 250 and it then calls GoPattemMatch as shown in function block 260. To see the process flow of GoPattemMatch, we swap to the diagram titled "Process Flow for BF's Pattern Matching Unit."

One key thing to notice is that functions depicted at the same level of the chart are called by in sequential order from left to right (or top to bottom) by their common parent function. For example, Main 200 calls ProcessCommandLine 210, then CreateStopListist 220, then CreatePatterns 230, then GoBackgroundFinder 240. FIGS. 3 to 6 detail the logic for the entire program, the parsing unit, the pattern matching unit and the search unit respectively. FIG. 6 details the logic determinative of data flow of key information through BackgroundFinder, and shows the functions that are responsible for creating or processing such information.

DETAILED SEARCH ARCHITECTURE UNDER THE SIMPLE QUERY MODE

SEARCH ALTA VISTA (Function block 270 of FIG. 2)

The Alta Vista search engine utilizes the identifies and returns general information about topics related to the current meeting as shown in function block 270 of FIG. 2. The system in accordance with a preferred embodiment takes all the keywords from the title portion of the original meeting text and constructs an advanced query to send to Alta Vista. The keywords are logically combined together in the query. The results are also ranked based on the same set of keywords. One of ordinary skill in the art will readily comprehend that a date restriction or publisher criteria could be facilitated on the articles we want to retrieve. A set of top ranking stories are returned to the calendaring system in accordance with a preferred embodiment.

NEWS PAGE (Function block 275 of FIG. 2)

The NewsPage search system is responsible for giving us the latest news topics related to a target meeting. The system takes all of the keywords from the title portion of the original meeting text and constructs a query to send to the NewsPage search engine. The keywords are logically combined together in the query. Only articles published recently are retrieved. The Newspage search system provides a date restriction criteria that is settable by a user according to the user's preference. The top ranking stories are returned to the calendaring system.

Figure 3:
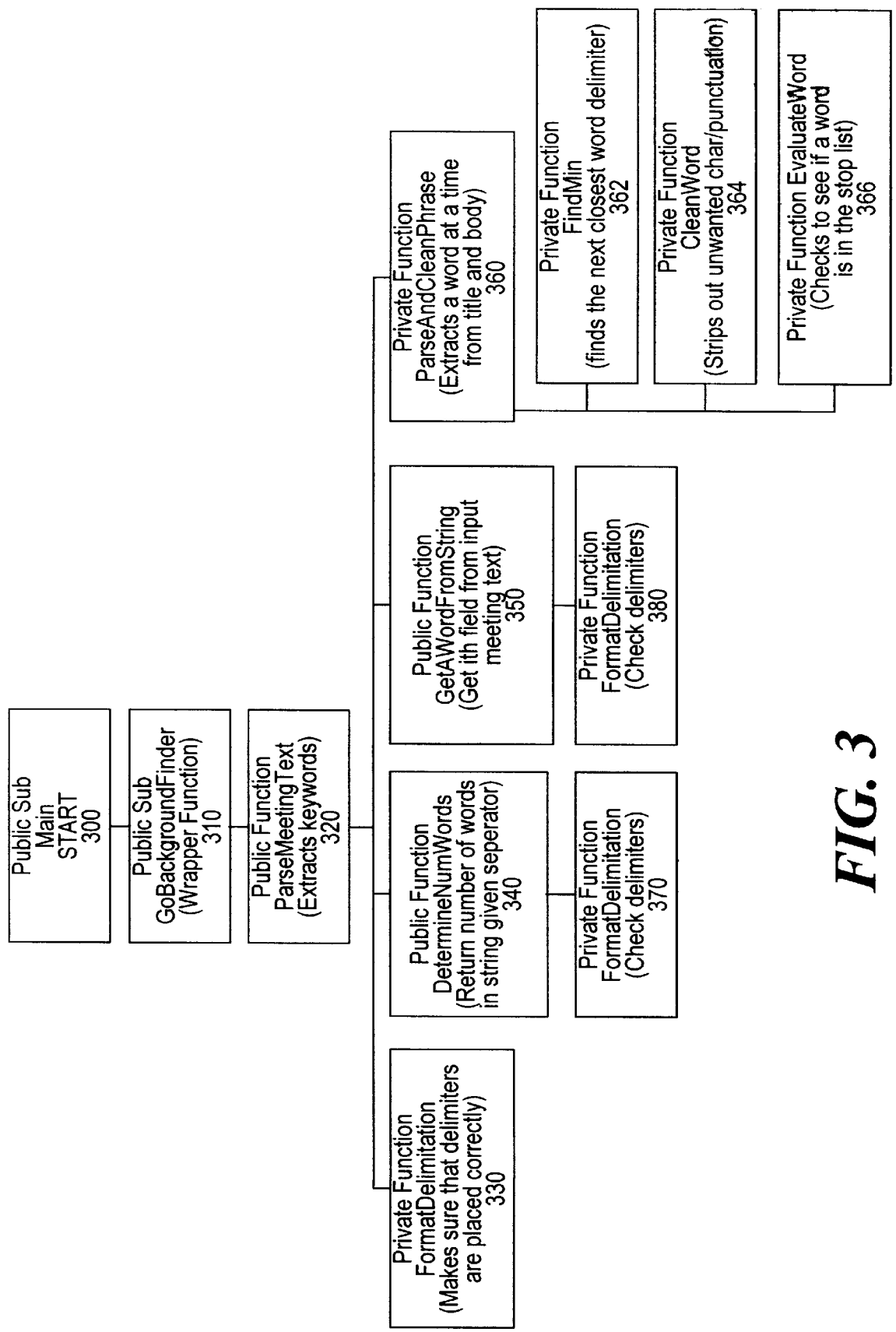
FIG. 3 is a flowchart of a parsing unit of the system in accordance with a preferred embodiment.

FIG. 3 is a user profile data model in accordance with a preferred embodiment. Processing commences at function block 300 which is responsible for invoking the program from the main module. Then, at function block 310, a wrapper function is invoked to prepare for the keyword extraction processing in function block 320. After the keywords are extracted, then processing flows to function block 330 to determine if the delimiters are properly positioned. Then, at function block 340, the number of words in a particular string is calculated and the delimiters for the particular field are and a particular field from the meeting text is retrieved at function block 350. Then, at function block 380, the delimiters of the string are again checked to assure they are placed appropriately. Finally, at function block 360, the extraction of each word from the title and body of the message is performed a word at a time utilizing the logic in function block 362 which finds the next closest word delimiter in the input phrase, function block 364 which strips unnecessary materials from a word and function block 366 which determines if a word is on the stop list and returns an error if the word is on the stop list.

PATTERN MATCHING IN ACCORDANCE WITH A PREFERRED EMBODIMENT

The limitations associated with a simple searching method include the following:

1. Because it relies on a stoplist of unwanted words in order to extract from the meeting text a set of keywords, it is limited by how comprehensive the stoplist is. Instead of trying to figure out what parts of the meeting text we should throw away, we should focus on what parts of the meeting text we want.
2. A simple search method in accordance with a preferred embodiment only uses the keywords from a meeting title to form queries to send to Alta Vista and NewsPage. This ignores an alternative source of information for the query, the body of the meeting notice. We cannot include the keywords from the meeting body to form our queries because this often results in queries which are too long and so complex that we often obtain no meaningful results.
3. There is no way for us to tell what each keyword represents. For example, we may extract "Andy" and "Grove" as two keywords. However, a simplistic search has no way knowing that "Andy Grove" is in fact a person's name. Imagine the possibilities if we could somehow intelligently guess that "Andy Grove" is a person's name. We can find out if he is an Andersen person and if so what kind of projects he's been on before etc. etc.
4. In summary, by relying solely on a stoplist to parse out unnecessary words, we suffer from "information overload".

PATTERN MATCHING OVERCOMES THESE LIMITATIONS IN ACCORDANCE WITH A PREFERRED EMBODIMENT

Here's how the pattern matching system can address each of the corresponding issues above in accordance with a preferred embodiment.

1. By doing pattern matching, we match up only parts of the meeting text that we want and extract those parts.
2. By performing pattern matching on the meeting body and extracting only the parts from the meeting body that we want. Our meeting body will not go to complete waste then.
3. Pattern matching is based on a set of templates that we specify, allowing us to identify people names, company names etc from a meeting text.
4. In summary, with pattern matching, we no longer suffer from information overload. Of course, the big problem is how well our pattern matching works. If we rely exclusively on artificial intelligence processing, we do not have a 100% hit rate. We are able to identify about 20% of all company names presented to us.

PATTERNS

A pattern in the context of a preferred embodiment is a template specifying the structure of a phrase we are looking for in a meeting text. The patterns supported by a preferred embodiment are selected because they are templates of phrases which have a high probability of appearing in someone's meeting text. For example, when entering a meeting in a calendar, many would write something such as "Meet with Bob Dutton from Stanford University next Tuesday." A common pattern would then be something like the word "with" followed by a person's name (in this example it is Bob Dutton) followed by the word "from" and ending with an organization's name (in this case, it is Stanford University).

PATTERN MATCHING TERMINOLOGY

The common terminology associated with pattern matching is provided below.

Pattern: a pattern is a template specifying the structure of a phrase we want to bind the meeting text to. It contains sub units.

Element: a pattern can contain many sub-units. These subunits are called elements. For example, in the pattern "with $PEOPLE$ from $COMPANY$", "with" "$PEOPLE$" "from" "$COMPANY$" are all elements.

Placeholder: a placeholder is a special kind of element in which we want to bind a value to. Using the above example, "$PEOPLE$" is a placeholder.

Indicator: an indicator is another kind of element which we want to find in a meeting text but no value needs to bind to it. There may be often more than one indicator we are looking for in a certain pattern. That is why an indicator is not an "atomic" type.

Substitute: substitutes are a set of indicators which are all synonyms of each other. Finding any one of them in the input is good.

There are five fields which are identified for each meeting:
Company ($COMPANY$)
People ($PEOPLE$)
Location ($LOCATION$)
Time ($TIME$)
Topic ($TOPIC_UPPER$) or ($TOPIC_ALL$)
In parentheses are the placeholders I used in my code as representation of the corresponding meeting fields.

Each placeholder has the following meaning:

$COMPANY$: binds a string of capitalized words (e.g. Meet with Joe Carter of <Andersen Consulting>)

$PEOPLE$: binds series of string of two capitalized words potentially connected by ",", "and" or "&" (e.g. Meet with <Joe Carter> of Andersen Consulting, Meet with <Joe Carter and Luke Hughes> of Andersen Consulting)

$LOCATION$: binds a string of capitalized words (e.g. Meet Susan at <Palo Alto Square>)

$TIME$: binds a string containing the format #:## (e.g. Dinner at <6:30 pm>)

$TOPEC_UPPER$: binds a string of capitalized words for our topic (e.g. <Stanford Engineering Recruiting> Meeting to talk about new hires).

$TOPIC_ALL$: binds a string of words without really caring if it's capitalized or not. (e.g. Meet to talk about <ubiquitous computing>)

Here is a table representing all the patterns supported by BF. Each pattern belongs to a pattern group. All patterns within a pattern group share a similar format and they only differ from each other in terms of what indicators are used as substitutes. Note that the patterns which are grayed out are also commented in the code. BF has the capability to support these patterns but we decided that matching these patterns is not essential at this point.

| PAT GRP | PAT # | PATTERN | EXAMPLE |
|---|---|---|---|
| 1 | a | $PEOPLE$ of $COMPANY$ | Paul Maritz of Microsoft |
|  | b | $PEOPLE$ from $COMPANY$ | Bill Gates, Paul Allen and Paul Maritz from Microsoft |
| 2 | a | $TOPIC_UPPER$ meeting | Push Technology Meeting |
|  | b | $TOPIC_UPPER$ mtg | Push Technology Mtg |
|  | c | $TOPIC_UPPER$ demo | Push Technology demo |
|  | d | $TOPIC_UPPER$ interview | Push Technology interview |
|  | e | $TOPIC_UPPER$ presentation | Push Technology presentation |
|  | f | $TOPIC_UPPER$ visit | Push Technology visit |
|  | g | $TOPIC_UPPER$ briefing | Push Technology briefing |
|  | h | $TOPIC_UPPER$ discussion | Push Technology discussion |
|  | i | $TOPIC_UPPER$ workshop | Push Technology workshop |
|  | j | $TOPIC_UPPER$ prep | Push Technology prop |
|  | k | $TOPIC_UPPER$ review | Push Technology review |
|  | l | $TOPIC_UPPER$ lunch | Push Technology lunch |
|  | m | $TOPIC_UPPER$ project | Push Technology project |
|  | n | $TOPIC_UPPER$ projects | Push Technology projects |
| 3 | a | $COMPANY$ corporation | Intel Corporation |
|  | b | $COMPANY$ corp. | IBM Corp |
|  | c | $COMPANY$ systems | Cisco Systems |
|  | d | $COMPANY$ limited | IBM limited |
|  | e | $COMPANY$ ltd | IBM ltd |
| 4 | a | about $TOPIC_ALL$ | About intelligent agents technology |
|  | b | discuss $TOPIC_ALL$ | Discuss intelligent agents technology |
|  | c | show $TOPIC_ALL$ | Show the client our intelligent agents technology |
|  | d | re: $TOPIC_ALL$ | re: intelligent agents technology |
|  | e | review $TOPIC_ALL$ | Review intelligent agents technology |
|  | f | agenda | The agenda is as follows: cleanup clean up cleanup |
|  | g | agenda: $TOPIC_ALL$ | Agenda: demo client intelligent agents technology demo ecommerce |
| 6 | a | w/$PEOPLE$ of $COMPANY$ | Meet w/Joe Carter of Andersen Consulting |
|  | b | w/$PEOPLE$ from $COMPANY$ | Meet w/Joe Carter from Andersen Consulting |
| 6 | a | w/$COMPANY$ per $PEOPLE$ | Talk w/Intel per Jason Foster |
| 8 | a | At $LOCATION$ | At LuLu's restaurant |
|  | b | In $LOCATION$ | in Santa Clara |
| 9 | a | Per $PEOPLE$ | per Susan Butler |
| 10 | a | call w/$PEOPLE$ | Conf call w/John Smith |
|  | B | call with $PEOPLE$ | Conf call with John Smith |
| 11 | A | prep for $TOPIC_ALL$ | Prep for London meeting |
|  | B | preparation for $TOPIC_ALL$ | Preparation for London meeting |

Figure 4:
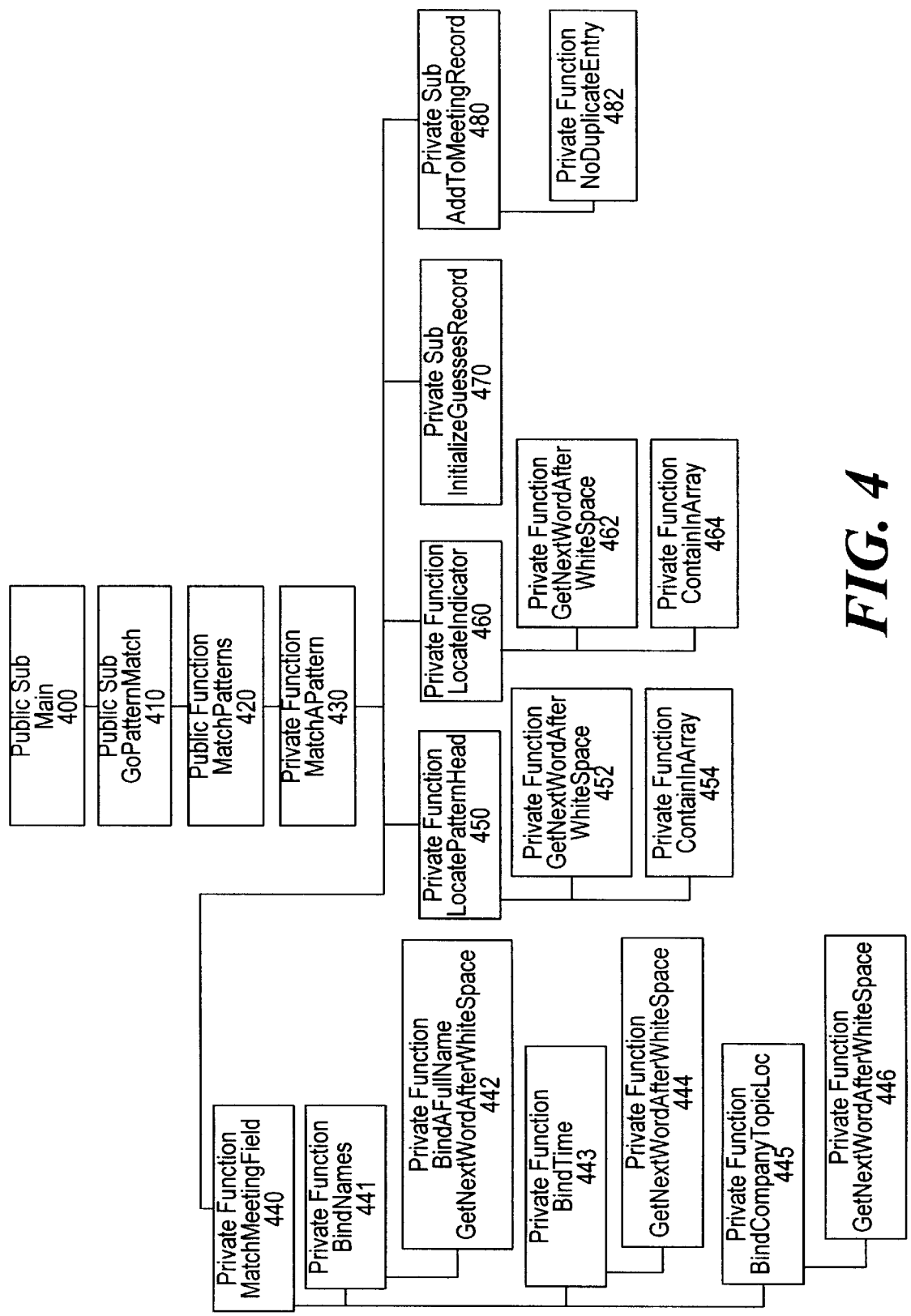
FIG. 4 is a flowchart for pattern matching in accordance with a preferred embodiment.

FIG. 4 is a detailed flowchart of pattern matching in accordance with a preferred embodiment. Processing commences at function block 400 where the main program invokes the pattern matching application and passes control to function block 410 to commence the pattern match processing. Then, at function block 420, the wrapper function loops through to process each pattern which includes determining if a part of the text string can be bound to a pattern as shown in function block 430. Then, at function block 440, various placeholders are bound to values if they exist, and in function block 441, a list of names separated by punctuation are bound, and at function block 442 a full name is processed by finding two capitalized words as a full name and grabbing the next letter after a space after a word to determine if it is capitalized. Then, at function block 443, time is parsed out of the string in an appropriate manner and the next word after a blank space in function block 444. Then, at function block 445, the continuous phrases of capitalized words such as company, topic or location are bound and in function block 446, the next word after the blank is obtained for further processing in accordance with a preferred embodiment. Following the match meeting field processing, function block 450 is utilized to locate an indicator which is the head of a pattern, the next word after the blank is obtained as shown in function block 452 and the word is checked to determine if the word is an indicator as shown in function block 454. Then, at function block 460, the string is parsed to locate an indicator which is not at the end of the pattern and the next word after unnecessary white space such as that following a line feed or a carriage return is processed as shown in function block 462 and the word is analyzed to determine if it is an indicator as shown in function block 464. Then, in function block 470, the temporary record is reset to the null set to prepare it for processing the next string and at function block 480, the meeting record is updated and at function block 482 a check is performed to determine if an entry is already made to the meeting record before parsing the meeting record again.

USING THE IDENTIFIED MEETING FIELDS

Now that we have identified fields within the meeting text which we consider important, there are quite a few things we can do with it. One of the most important applications of pattern matching is of course to improve the query we construct which eventually gets submitted to Alta Vista and News Page. There are also a lot of other options and enhancements which exploit the results of pattern matching that we can add to BF. These other options will be described in the next section. The goal of this section is to give the reader a good sense of how the results obtained from pattern matching can be used to help us obtain better search results.

Figure 5:
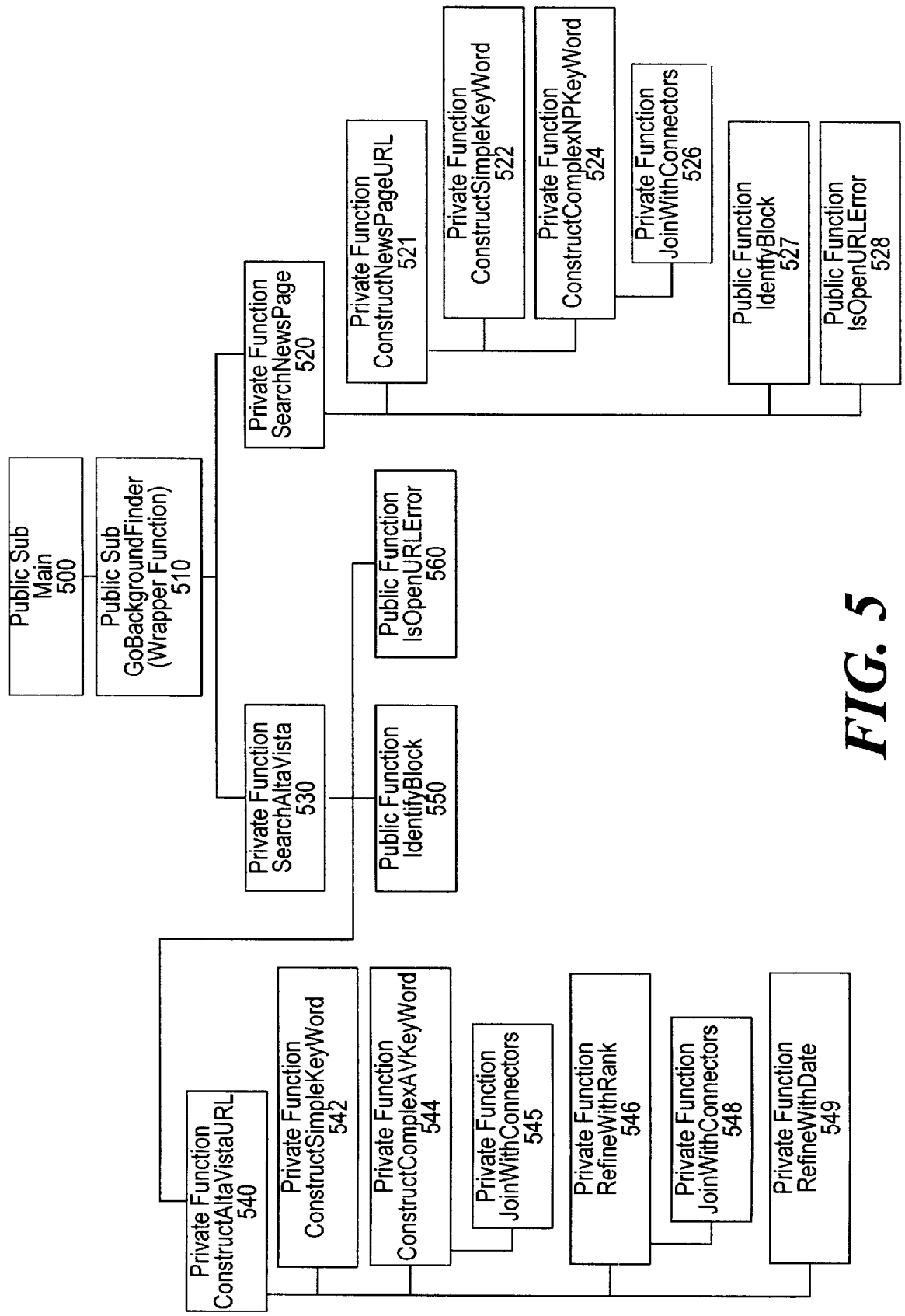
FIG. 5 is a flowchart for a search unit in accordance with a preferred embodiment.
Figure 6:
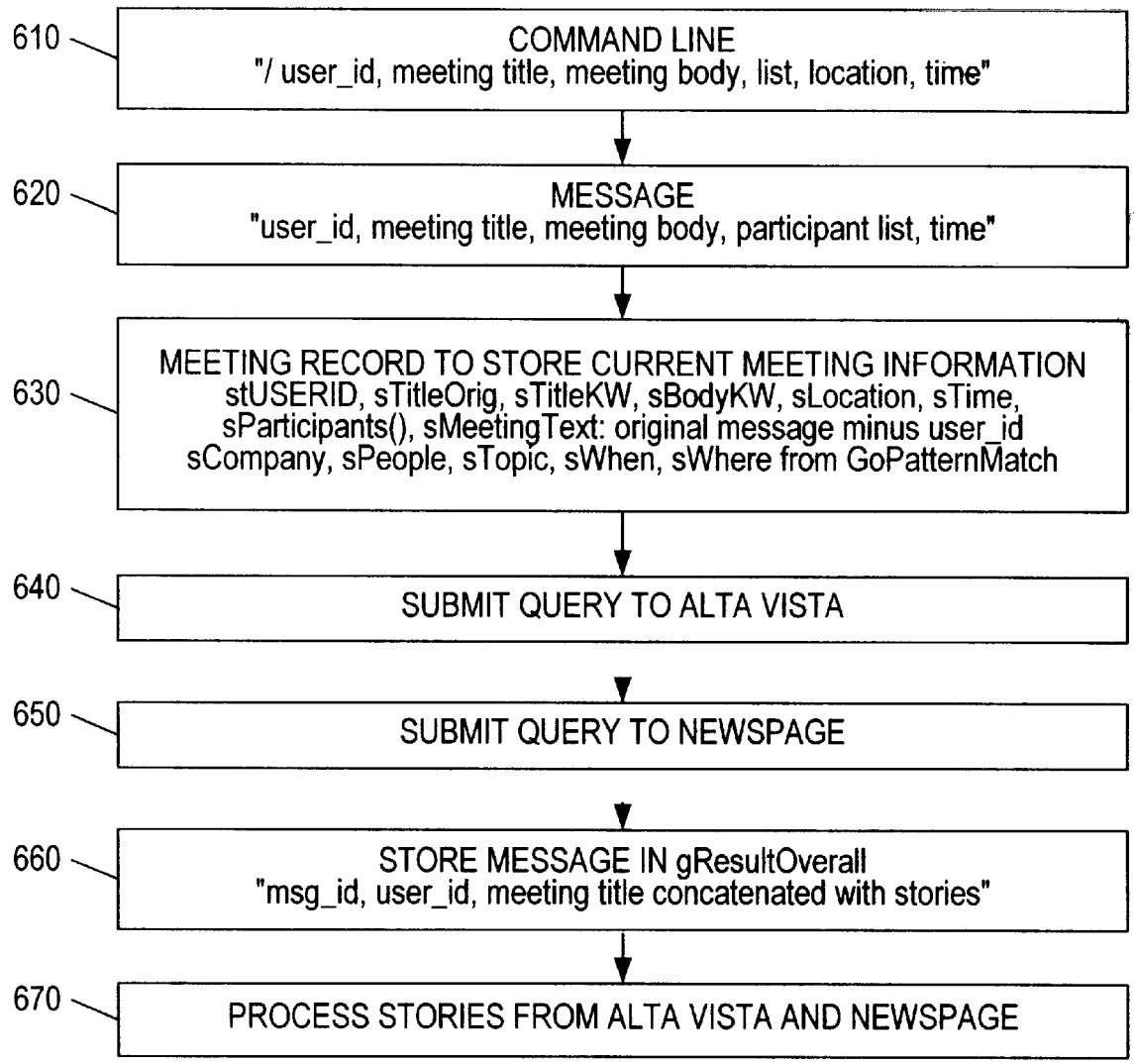
FIG. 6 is a flowchart for overall system processing in accordance with a preferred embodiment.

FIG. 5 is a flowchart of the detailed processing for preparing a query and obtaining information from the Internet in accordance with a preferred embodiment. Processing commences at function block 500 and immediately flows to function block 510 to process the wrapper functionality to prepare for an Internet search utilizing a web search engine. If the search is to utilize the Alta Vista search engine, then at function block 530, the system takes information from the meeting record and forms a query in function blocks 540 to 560 for submittal to the search engine. If the search is to utilize the NewsPage search engine, then at function block 520, the system takes information from the meeting record and forms a query in function blocks 521 to 528.

The Alta Vista Search Engine

The strength of the Alta Vista search engine is that it provides enhanced flexibility. Using its advance query method, one can construct all sorts of Boolean queries and rank the search however you want. However, one of the biggest drawbacks with Alta Vista is that it is not very good at handling a large query and is likely to give back irrelevant results. If we can identify the topic and the company within a meeting text, we can form a pretty short but comprehensive query which will hopefully yield better results. We also want to focus on the topics found. It may not be of much merit to the user to find out info about a company especially if the user already knows the company well and has had numerous meetings with them. It's the topics they want to research on.

News Page Search Engine

Figure 7:
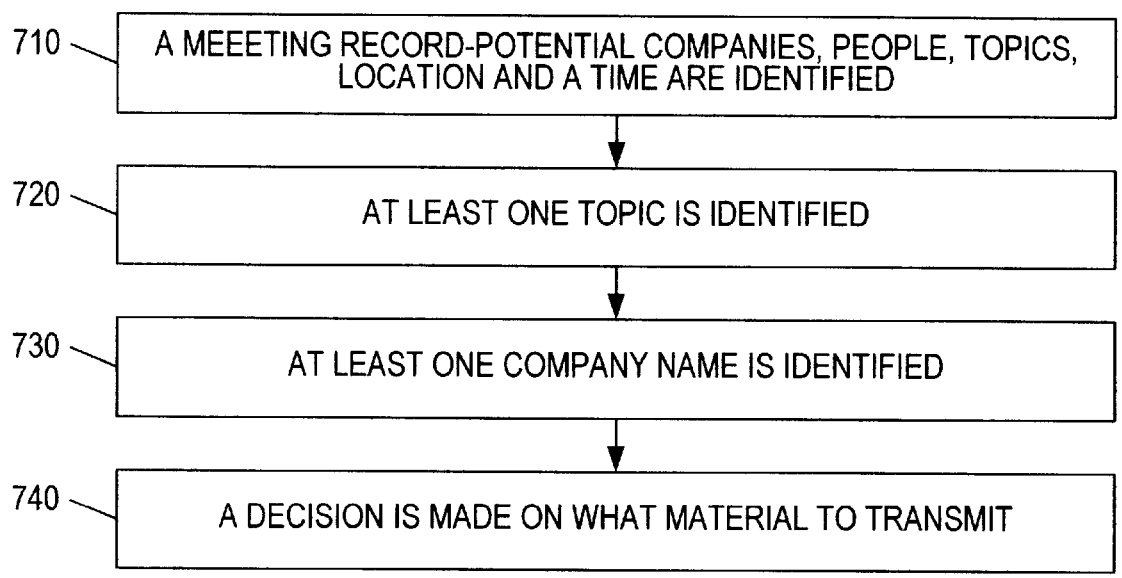
FIG. 7 is a flowchart of topic processing in accordance with a preferred embodiment.
Figure 8:
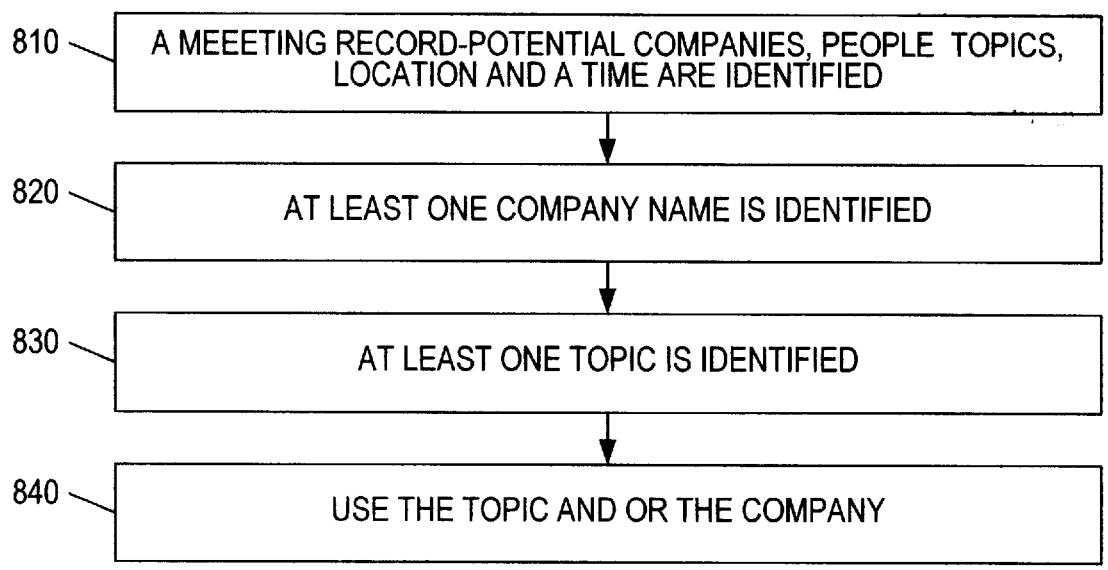
FIG. 8 is a flowchart of meeting record processing in accordance with a preferred embodiment.

The strength of the News Page search engine is that it does a great job searching for the most recent news if you are able to give it a valid company name. Therefore when we submit a query to the news page web site, we send whatever company name we can identify and only if we cannot find one do we use the topics found to form a query. If neither one is found, then no search is performed. The algorithmn utilized to form the query to submit to Alta Vista is illustrated in FIG. 7. The algorithmn that we will use to form the query to submit to News Page is illustrated in FIG. 8.

The following table describes in detail each function in accordance with a preferred embodiment. The order in which functions appear mimics the process flow as closely as possible. When there are situations in which a function is called several times, this function will be listed after the first function which calls it and its description is not duplicated after every subsequent function which calls it.

| Procedure Name | Type | Called By | Description |
| --- | --- | --- | --- |
| Main (BF.Main) | Public Sub | None | This is the main function where the program first launches. It initializes BF with the appropriate parameters(e.g. Internet time-out, stoplist. . . ) and calls GoBF to launch the main part of the program. |
| ProcessCommandLine (BF.Main) | Private Sub | Main | This function parses the command line. .It assumes that the delimiter indicating the beginning of input from Munin is stored in the constant CMD_SEPARATOR. |
| CreateStopList (BF.Main) | Private Function | Main | This function sets up a stop list for future use to parse out unwanted words from the meeting text. There are commas on each side of each word to enable straight checking. |
| CreatePatterns (BF.PatternMatch) | Public Sub | Main | This procedure is called once when BF is first initialized to create all the potential patterns that portions of the meeting text can bind to. A pattern can contain however many elements as needed. There are two types of elements. The first type of elements are indicators. These are real. words which. delimit the potential of a meeting field |

-continued

| Procedure Name | Type | Called By | Description |
|---|---|---|---|
| | | | (e.g. company) to follow. Most of these indicators are stop words as expected because. stop words are words usually common to all meeting text so it makes sense they form patterns. The second type of elements are special strings which represent placeholders. A placeholder is always in the form of $*$ where * can be either PEOPLE, COMPANY, TOPIC_UPPER, TIME,LOCATION or TOPIC_ALL. A pattern can begin with either one of the two types of elements and can be however long, involving; however any number/type of elements. This procedure dynamically creates a new pattern record for each pattern in the table and it also dynamically creates new tApatternElements for each element within a pattern. In addition, there is the concept of being able to substitute indicators within a pattern. For example, the pattern $PEOPLE$ of $COMPANY$ is similar to the pattern $PEOPLE$ from $COMPANY$. "from" is a substitute for "to". Our structure should be able to express such 'a need for substitution. |
| GoBF (BF.Main) | Public Sub | Main | This is a wrapper procedurer that calls both the parsing and the searching subroutines of the BF. It is also responsible for sending data back to Munin. |
| ParseMeetingText (BF.Parse) | Public Function | GoBackGroundFinder | This function takes the initial meeting text and identifies the userID of the record as well as other parts of the meeting text including the title, body, participant list, location and time. In addition, we call a helper function ProcessStopList to eliminate all the unwanted words from the original meeting title and meeting body so that only keywords are left. The information parsed out is stored in the MeetingRecord structure. Note that this function does no error checking and for the most time assumes that the meeting text string is correctly formatted by Munin. The important variable is thisMeeting Record is the temp holder for all info regarding current meeting. It's eventually returned to caller. |
| FormatDelimitation (BF.Parse) | Private | ParseMeetingText, DetermineNumWords, GetAWordFromString | There are 4 ways in which the delimiters can be placed. We take care of all these cases by reducing them down to Case 4 in which there are no delimiters around but only between fields in a string (e.g., A::B::C) |
| DetermineNumWords (BF.Parse) | Public Function | ParseMeetingText, ProcessStopList | This functions determines a string (stInEvalString) The function assumes that each word is separated by a designated separator as specified in stSeparator. The return type is an integer that indicates how many words have been found assuming each word in the string is separated by stSeparator. This function is always used along with GetAWordFromString and should be called before calling GetAWordFromString. |
| GetAWordFromString (BF .Parse) | Public Function | ParseMeetingText, ProcessStopList | This function extracts the ith word of the string(stInEvalString) assuming that each word in the string is separated by a designated separator contained in the variable stSeparator. In most cases, use this function with DetermineNumWords. The function returns the wanted word. This function checks to make sure that iLnWordNum is within bounds so that i is not greater that the total number of words in string or less than/equal to zero. If it |

-continued

| Procedure Name | Type | Called By | Description |
| --- | --- | --- | --- |
| ParseAndCleanPhrase (BF.Parse) | Private Function | ParseMeetingText | is out of bounds, we return empty string to indicate we can't get anything. We try to make sure this doesn't happen by calling DetermineNumWords first. This function first grabs the word and send it to CleanWord in order strip the stuff that nobody wants. There are things in parseWord that will kill the word, so we will need a method of looping through the body and rejecting words without killing the whole function i guess keep CleanWord and check a return value. ok, now I have a word so I need to send it down the parse chain. This chain goes goes ParseCleanphrase —> CleanWord —> EvaluateWord. If the word gets through the entire chain without being killed, it Will be added at the end to our keyword string. first would be the function that checks for "/" as a delimiter and extracts the parts of that. This I will call "StitchFace" (Denise is more normal and calls it' GetAWordFromString) if this finds words; then each of these will be sent, in turn, down the chain. If these get through the entire chain without being added or killed then they will be added rather than tossed. |
| FindMin (BF.Parse) | Private Function | ParseAndCleanPhrase | This function takes in 6 input values and evaluates to see what the minimum non zero value is. It first creates an array as a holder so that we can sort the five input values in ascending order. Thus the minimum value will be the first non zero value element of the array. If we go through entire array without finding a non zero value, we know that there is an error and we exit the function. |
| CleanWord (BF.Parse) | Private Function | ParseAndCleanPhrase | This function tries to clean up a word in a meeting text. It first of all determines if the string is of a valid length. It then passes it through a series of tests to see it is clean and when needed, it will edit the word and strip unnecessary characters off of it. Such tests includes getting rid of file extensions, non chars, numbers etc. |
| EvaluateWord (BF.Parse) | Private Function | ParseAndCleanPhrase | This function tests to see if this word is in the stop list so it can determine whether to eliminate the word from the original meeting text. If a word is not in the stoplist, it should stay around as a keyword and this function exits beautifully with errors. However, if the words is a stopword, an error must be returned. We must properly delimit the input test string so we don't accidentally retrieve sub strings. |
| GoPatternMatch (BF.PatternMatch) | Public Sub | GoBF | This procedure is called when our QueryMethod is set to complex query meaning we do want to do all the pattern matching stuff.It which initializes some arrays and then invokes pattern matching on the title and the body. |
| Matchpatterns (BF.PatternMatch) | Public Sub | GoPattern Match | This procedure loops through every pattern in the pattern table and tries to identify different fields within a meeting text specified by sInEvalString. For debugging purposes it also tries to tabulate how many times a certain pattern was triggered and stores it in gTabulateMatches to see which pattern fired the most. gTabulateMatches is stored as a global because we |

-continued

| Procedure Name | Type | Called By | Description |
|---|---|---|---|
| MatchApattem (BF.Pattern Match) | Private Function | MatchPatterns | want to be able to run a batch file of 40 or 50 test strings and still. be able to know how often a pattern was triggered. This function goes through each element in the current pattern. It first evaluates to determine whether element a placeholder or an indicator If it is a placeholder, then it will try to bind the placeholder with some value If it is an indicator, then we try to locate it. There is a trick however. Depending on whether we are at current element is the head of the pattern or not we want to take different actions. If we are at the head, we want to look for the indicator or the placeholder. If we can't find it, then we know that the current pattern doesn't exist and we quit. However, if it is not the head, then we continue looking, because there may still be a head somewhere. We retry in this case. |
| etingField (BF.Pattern Match) | Private Function | MatchAPattern | This function uses a big switch statement to first determine what kind of placeholder we are talking about and depending on what type of placeholder, We have specific requirements and different binding criteria as specified in the subsequent functions called such as BindNames, BindTime etc. If binding is successful we add it to our guessing record. |
| BindNames (BF.Pattern Match) | Private Function | MatchMeetingFi eld | In this function, we try to match names to the corresponding placeholder $PEOPLE$. Names are defined as any consecutive two words which are capitalized. We also what to retrieve a series of names which are connected by and, or & |

-continued

| Procedure Name | Type | Called By | Description |
|---|---|---|---|
| | | | so we look until we don't see any of these 3 separators anymore. Note that we don't want to bind single word names because it is probably too general anyway so we don't want to produce broad but irrelevant results. This function calls BindAFullName which binds one name so in a since BindNames collects all the results from BindAFullName |
| BindAFullNa ine (BF.Pattern Match) | Private Function | BindNames | This function tries to bind a full name. If the $PEOPLE$ placeholder is not the head of the pattern, we know that it has to come right at the beginning of the test string because we've been deleting stuff off the head of the string all along. If it is the head, we search until we find something that looks like a full name. If we can't find it, then there's no such pattern in the text entirely and we quit entirely from this pattern. This should eventually return us to the net pattern in MatchPatterns. |
| GetNextWor dAfterWhite Space (BF.Pattern Match) | Private Function | BinAFull Name, BindTime, BindCompanyTo picLoc | This function grabs the next word in a test string. It looks for the next word after white spaces, @ or /. The word is defined to end when we encounter another one of these white spaces or separators. |
| BindTime (BF.Pattern Match) | Private Function | MatchMeetingFi eld | Get the immediate next word and see if it looks like a time pattern. If so we've found a time and so we want to add it to the record. We probably should add more time patterns. But people don't seem to like to enter the time in their titles these days especially since we. now have tools like Outlook. |

-continued

| Procedure Name | Type | Called By | Description |
|---|---|---|---|
| BindCompanyTopicLoc (BF.PatternMatch) | Private Function | MatchMeetingField | This function finds a continuous capitalized string and binds it to stMatch which is passed by reference from MatchMeetingField. A continous capitalized sting is a sequence of capitalized words which are not interrupted by things like, . etc. There's probably more stuff we can add to the list of interruptions. |
| LocatePatternHead (BF.Pattern.Match) THE HEAD of the pattern | Private Function | MatchAPattern | This function tries to locate an element which is an indicator. Note that this indicator SHOULD BE AT otherwise it would have gone to the function LocateIndicator instead. Therefore; we keep on grabbing the next word until either there's no word for us to grab (quit) or if we find one of the indicators we are looking for. |
| ContainInArray (BF.PatternMatch) | Private Function | LocatePatternHead, LocateIndicator | ' This filnction is really simple. It loops through all the elements in the array ' to find a matching string. |
| LocateIndicator (BF.PatternMatch) | Private Function | MatchAPattern | This function tries to locate an element which is an indicator. Note that this indicator is NOT at the head of the pattern otherwise it would have gone to LocatePatternHead instead. Because of this, if our pattern is to be satisfied, the next word we grab HAS to be the indicator or else we would have failed. Thus we only grab one word, test to see if it is a valid indicator and the return result. |
| InitializeGuessesRecord (BF.PatternMatch) | Private Sub | MatchAPattern | This function reinitializes our temporary test structure because we have already transferred the info to the permanent structure, we can reinitialize it so they each have one element |
| AddToMeetingRecord (BF.PatteriiMatch) | Private Sub | MatchAPattern | This function is only called when we know that the information stored in tInCurrGuesses is valid meaning that it represents legitimate guesses of meeting fields ready to be stored in the: permanent record,InMeetingRecord. We check to make sure that we do not store duplicates and we also what to clean up what we want to store so that there's no uttered crap such as punctuations, etc. The reason why we don't clean up until now is to save time. We don't waste resources calling ParseAndCleanPhrase until we know for sure that we are going to add it permanently. |
| NoDuplicateEntry (BF.PatternMatch) | Private Function | AddToMeetingRecord | This function loops through each element in the array to make sure that the test sting aString is not the same as any of the strings already stored in the array. Slightly different from ContainInArray. |
| SearchAltaVista (BF.Search) | Public Function | GoBackGroundFinder | This function prepares a query to be submitted to AltaVistaSearch engine. It submits it and then parses the returning result in the appropriate format containing the title, URL and body/summary of each story retrieved. The number of stories retrieved is specified by the constant NUM_AV_STORIES. Important variables include stURLAltaVista used to store query to submit stResultHTML used to stcre html from page specified by stURLAltaVista. |
| ConstructAltaVistaURL (BF.Search) | Private Function | SearchAltaVista | This fiuiction constructs the URL string for the alta vista search engine using the advanced query search mode. It includes the keywords to be used, the language and |

-continued

| Procedure Name | Type | Called By | Description |
| --- | --- | --- | --- |
| | | | how we want to rank the search. Depending on whether we want to use the results of our pattern matching unit, we construct our query differently. |
| ConstructSimpleKeyWord (BF.Search) | Private Function | ConstructAltaVistaURl, ConstructNewsPageURL | This function marches down the list of keywords stored in the stTitleKW or stBodyKW fields of the input meeting record and links them up into one string with each keyword separated by a connector as determined by the input variable stInConnector. Returns this newly constructed string. |
| ConstructComplexAVKeyWord (BF. Search) | Private Function | ConstructAltaVistaURL | This function constructs the keywords to be send to the AltaVista site. Unlike ConstructSimpleKeyWord which simply takes all the keywords from the title to form the query, this function will look at the results of BF's pattern matching process and see if we are able to identify any specific company names or topics for constructing the queries. Query will include company and topic identified and default to simple query if we cannot identify either company or topic. |
| JoinWithConnectors (BF.Search) | Private Function | ConstructComplexAVKeyWord, ConstructComplexNPKeyWord, RefineWithRank | This function simply replaces the spacesbetween the words within the string with a connector which is specified by the input. |
| RefineWithDate (NOT CALLED AT THE MOMENT) (BF. Search) | Private Function | ConstructAltaVistaURL | This function constructs the date portion of the alta vista query and returns this portion of the URL as a string. It makes sure that alta vista searches for articles within the past PAST_NDAYS. |
| RefineWithRank (BF.Search) | Private Function | ConstructAltaVistaURL | This function constructs the string needed to passed to Altavista in order to rank an advanced query search. If we are constructing the simple query we will take in all the keywords from the title. For the complex query, we will take in words from company and topic, much the same way we formed the query in ConstructComplexAVKeyWord. |
| IdertifyBlock (BF.Parse) | Public Function | SearchAltaVista, SearchNewsPage | This function extracts the block within a string marked by the beginning and the ending tag given as inputs string at a certain location(iStart). The block retrieved does not include the tags themselves. If the block cannot be identified with the specified delimiters, we return unsuccessful through the parameter iReturnSuccess passed to use by reference. The return type is the block retrieved. |
| IsOpenURL Error (BF.Error) | Public Function | SearchAltaVista, SearchNewsPage | This function determines whether the error encountered is that of a timeout error. It restores the mouse to default arrow and then returns true if it is a time out or false otherwise. |
| SearchNewsPage (BF.Search) | Public Function | GoBackGroundFinder NewsPageSearch | This function prepares a query to be submitted to engine. It submits it and then parses the returning result in the appropriate format containing the title, URL and body/summary of each story retrieved. The number of stories retrieved is specified by the constant UM_NP_STORIES |
| ConstructNewsPageURL (BF.Search) | Private Function | SearchNewsPage NewsPage site. It uses the | This function constructs the URL to send to the information contained in the input meeting record to determine what keywords to use. Also depending whether we want simple or complex query, We call diffent functions to form stings. |

-continued

| Procedure Name | Type | Called By | Description |
|---|---|---|---|
| ConstructCo mplexNPKey Word (BF. Search) | Private Function | ConstructNewsP ageURL NewsPage site. | This function constructs the keywords to be send to the UnlikeConstructKeyWord-String which simply takes all the keywords from the title to form the query, this function will look at the results of BF's pattern matching process and see if we are able to identify any specific company names or topics for constructing the queries. Since newspage works best when we have a company name, we'll use only the company name and only if there is no company will we use topic. |
| ConstructOv erallResult (BF .Main) | Private Function | GoBackGroundF inder | This function takes in as input an array of strings (stInStories) and a MeetingRecord which stores the information for the current meeting. Each element in the array stores the stories retrieved from each information source. The function simply constructs the appropriate output to send to Munin including a return message type to let Munin know that it is the BF responding and also the original user_id and meeting title so Munin knows which meeting BF is talking about. |
| ConnectAnd TransferTo Munin (BF.Main) | Public Sub | GoBackGroundF inder | This function allows Background Finder to connect to Munin and eventually transport information to Munin. We will be using the UDP protocol instead of the TCP protocol so we have to set up the remote host and port correctly: We use a global string to store gResult Overall because although it is unnecessary with UDP, it is needed with TCP and if we ever switch back don't want |

-continued

| Procedure Name | Type | Called By | Description |
|---|---|---|---|
| DisconnectFr omMuninAn d Quit (BF.Main) | Public Sub | | to change code. |

FIG. 6 is a flowchart of the actual code utilized to prepare and submit searches to the Alta Vista and Newspage search engines in accordance with a preferred embodiment.

Processing commences at function block 610 where a command line is utilized to update a calendar entry with specific calendar information. The message is next posted in accordance with function block 620 and a meeting record is created to store the current meeting information in accordance with function block 630. Then, in function block 640 the query is submitted to the Alta Vista search engine and in function block 650, the query is submitted to the Newspage search engine. When a message is returned from the search engine, it is stored in a results data structure as shown in function block 660 and the information is processed and stored in summary form in a file for use in preparation for the meeting as detailed in function block 670.

FIG. 7 provides more detail on creating the query in accordance with a preferred embodiment. Processing commences at function block 710 where the meeting record is parsed to obtain potential companies, people, topics, location and a time. Then, in function block 720, at least one topic is identified and in function block 720, at least one company name is identified and finally in function block 740, a decision is made on what material to transmit to the file for ultimate consumption by the user.

FIG. 8 is a variation on the query theme presented in FIG. 7. A meeting record is parsed in function block 800, a company is identified in function block 820, a topic is identified in function block 830 and finally in function block 840 the topic and or the company is utilized in formulating the query.

Alternative embodiments for adding various specific features for specific user requirements are discussed below.

Enhance Target Rate for Pattern Matching

To increase BF's performance, more patterns/pattern groups are added to the procedure "CreatePatterns." The existing code for declaring patterns can be used as a template for future patterns. Because everything is stored as dynamic arrays, it is convenient to reuse code by cutting and pasting. The functions BindName, BindTime, BindCompanyLoc-Topic which are responsible for associating a value with a placeholder can be enhanced. The enhancement is realized by increasing the set of criteria for binding a certain meeting field in order to increase the number of binding values. For example, BindTime currently accepts and binds all values in the form of ##:## or #:##. To increase the times we can bind, we may want BindTime to also accept the numbers 1 to 12 followed by the more aesthetic time terminology "o'clock." Vocabulary based recognition algorithms and assigning an accuracy rate to each guess BF makes allowing only guesses which meet a certain threshold to be valid.

Depending on what location the system identifies through pattern matching or alternatively depending on what location the user indicates as the meeting place, a system in accordance with a preferred embodiment suggests a plurality of fine restaurants whenever it detects the words lunch/dinner/breakfast. We can also use a site like company finder to confirm what we got is indeed a company name or if there is no company name that pattern matching can identify, we can use a company finder web site as a "dictionary" for us to determine whether certain capitalized words represent a company name. We can even display stock prices and breaking news for a company that we have identified.

Wireless Bargain Identification in Accordance With A Preferred Embodiment

Figure 9:
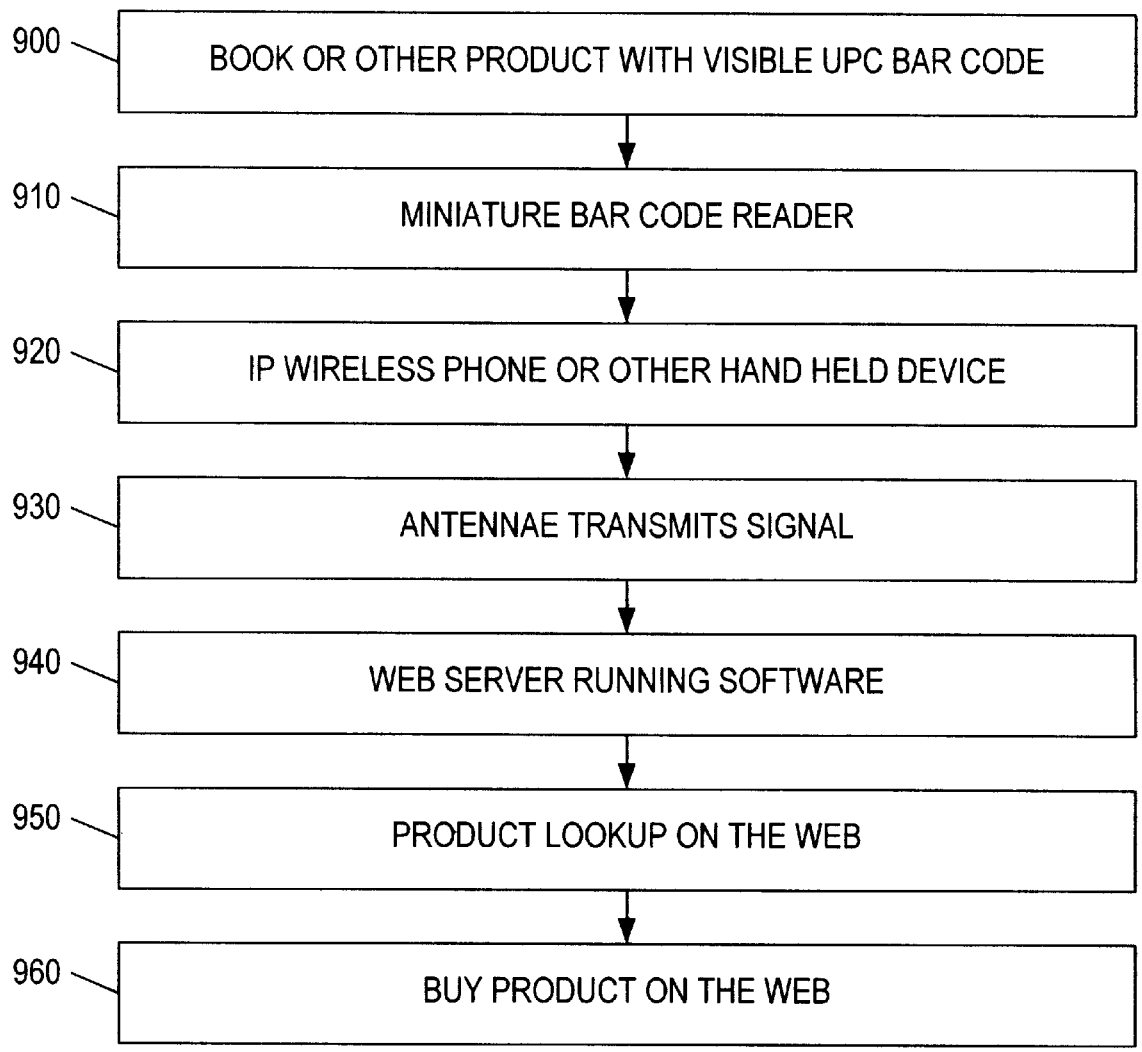
FIG. 9 is a block diagram of process flow of a pocket bargain finder in accordance with a preferred embodiment.

FIG. 9 is a flow diagram that depicts the hardware and logical flow of control for a device and a software system designed to allow Web-based comparison shopping in conventional, physical, non-Web retail environments. A wireless phone or similar hand-held wireless device 920 with Internet Protocol capability is combined with a miniature barcode reader 910 (installed either inside the phone or on a short cable) and used to scan the Universal Product Code (UPC) bar code on a book or other product 900. The wireless device 920 transmits the bar code via an antennae 930 to the Pocket BargainFinder Service Module (running on a Web server) 940, which converts it to (in the case of books) its International Standard Book Number or (in the case of other products) whatever identifier is appropriate. The Service Module then contacts the appropriate third-party Web site(s) to find price, shipping and availability information on the product from various Web suppliers 950. This information is formatted and displayed on the hand-held device's screen. The IP wireless phone or other hand held device 920 utilizes a wireless modem such as a Ricochet SE Wireless Modem from Metricom. Utilizing this device, a user can hang out in a coffee shop with a portable computer perched on a rickety little table, with a latte sloshing dangerously close to the keyboard, and access the Internet at speeds rivaling direct connect via a telephone line.

The 8-ounce Ricochet SE Wireless Modem is about as large as a pack of cigarettes and setup is extremely simple, simply attach the modem to the back of your portable's screen with the included piece of Velcro, plug the cable into the serial port, flip up the stubby antenna, and transmit. Software setup is equally easy: a straightforward installer adds the Ricochet modem drivers and places the connection icon on your desktop. The functional aspects of the modem are identical to that of a traditional telephone modem.

Of course, wireless performance isn't nearly as reliable as a traditional dial-up phone connection. We were able to get strong connections in several San Francisco locations as long as we stayed near the windows. But inside CNET's all-brick headquarters, the Ricochet couldn't connect at all. When you do get online, performance of up to 28.8 kbps is available with graceful degradation to slower speeds. But even the slower speeds didn't disappoint. Compared to the alternative—connecting via a cellular modem—the Ricochet is much faster, more reliable, and less expensive to use. Naturally, the SE Wireless is battery powered. The modem has continuous battery life of up to 12 hours. And in accordance with a preferred embodiment, we ran down our portable computer's dual cells before the Ricochet started to fade.

Thus, utilizing the wireless modem, a user may utilize the web server software 940 to identify the right product 950 and then use an appropriate device's key(s) to select a supplier and place an order in accordance with a preferred embodiment. The BargainFinder Service Module then consummates the order with the appropriate third-party Web supplier 960.

mySite! Personal Web Site & Intentions Value Network Prototype mySite! is a high-impact, Internet-based application in accordance with a preferred embodiment that is focused on the theme of delivering services and providing a personalized experience for each customer via a personal web site in a buyer-centric world. The services are intuitively organized around satisfying customer intentions—fundamental life needs or objectives that require extensive planning decisions, and coordination across several dimensions, such as financial planning, healthcare, personal and professional development, family life, and other concerns. Each member owns and maintains his own profile, enabling him to create and browse content in the system targeted specifically at him. From the time a demand for products or services is entered, to the completion of payment, intelligent agents are utilized to conduct research, execute transactions and provide advice. By using advanced profiling and filtering, the intelligent agents learn about the user, improving the services they deliver. Customer intentions include Managing Daily Logistics (e.g., email, calendar, contacts, to-do list, bill payment, shopping, and travel planning); and Moving to a New Community (e.g., finding a place to live, moving household possessions, getting travel and shipping insurance coverage, notifying business and personal contacts, learning about the new community). From a consumer standpoint, mysite! provides a central location where a user can access relevant products and services and accomplish daily tasks with ultimate ease and convenience.

From a business standpoint, mySite! represents a value-added and innovative way to effectively attract, service, and retain customers. Intention value networks allow a user to enter through a personalized site and, and with the assistance of a learning, intelligent agent, seamlessly interact with network participants. An intention value network in accordance with a preferred embodiment provides superior value. It provides twenty four hour a day, seven days a week access to customized information, advice and products. The information is personalized so that each member views content that is highly customized to assure relevance to the required target user.

Egocentric Interface

An Egocentric Interface is a user interface crafted to satisfy a particular user's needs, preferences and current context. It utilizes the user's personal information that is stored in a central profile database to customize the interface. The user can set security permissions on and preferences for interface elements and content. The content integrated into the Egocentric Interface is customized with related information about the user. When displaying content, the Egocentric Interface will include the relationship between that content and the user in a way that demonstrates how the content relates to the user. For instance, when displaying information about an upcoming ski trip the user has signed up for, the interface will include information about events from the user's personal calendar and contact list, such as other people who will be in the area during the ski trip. This serves to put the new piece of information into a context familiar to the individual user.

Figure 10A:
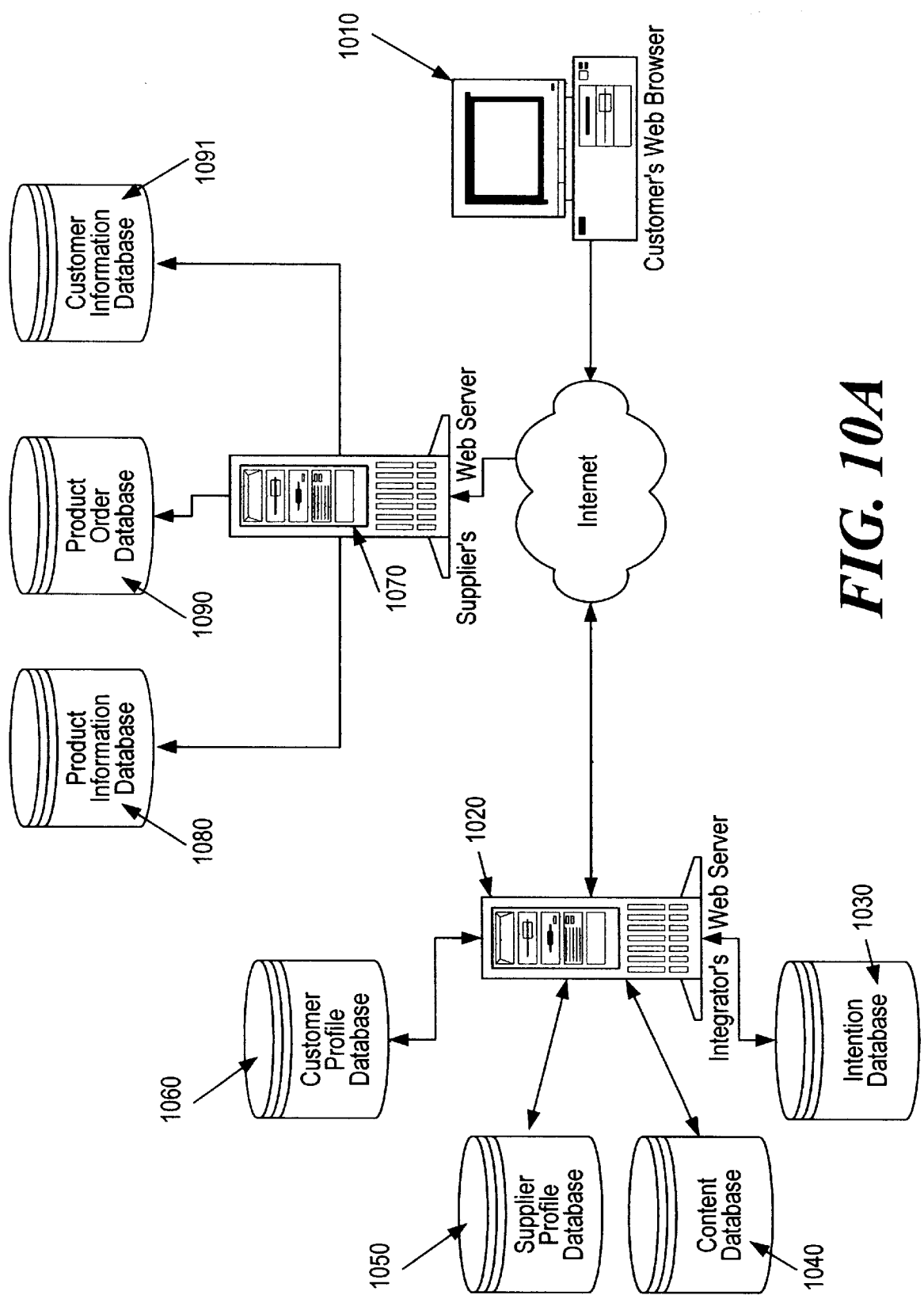
FIG. 10A and 10B are a block diagram and flowchart depicting the logic associated with creating a customized content web page in accordance with a preferred embodiment.

FIG. 10A describes the Intention Value Network Architecture implementation for the World Wide Web. For simplification purposes, this diagram ignores the complexity pertaining to security, scalability and privacy. The customer can access the Intention Value Network with any Internet web browser 1010, such as Netscape Navigator or Microsoft Internet Explorer, running on a personal computer connected to the Internet or a Personal Digital Assistant with wireless capability. See FIG. 17 for a more detailed description of the multiple methods for accessing an Intention Value Network. The customer accesses the Intention Value Network through the unique name or IP address associated with the Integrator's Web Server 1020. The Integrator creates the Intention Value Network using a combination of resources, such as the Intention Database 1030, the Content Database 1040, the Supplier Profile Database 1050, and the Customer Profile Database 1060.

The Intention Database 1030 stores all of the information about the structure of the intention and the types of products and services needed to fulfill the intention. Information in this database includes intention steps, areas of interest, layout templates and personalization templates. The Content Database 1040 stores all of the information related to the intention, such as advice, referral information, personalized content, satisfaction ratings, product ratings and progress reports.

The Supplier Profile Database 1050 contains information about the product and service providers integrated into the intention. The information contained in this database provides a link between the intention framework and the suppliers. It includes product lists, features and descriptions, and addresses of the suppliers' product web sites. The Customer Profile Database 1060 contains personal information about the customers, such as name, address, social security number and credit card information, personal preferences, behavioral information, history, and web site layout preferences. The Supplier's Web Server 1070 provides access to all of the supplier's databases necessary to provide information and transactional support to the customer.

The Product Information Database 1080 stores all product-related information, such as features, availability and pricing. The Product Order Database 1090 stores all customer orders. The interface to this database may be through an Enterprise Resource Planning application offered by SAP, Baan, Oracle or others, or it may be accessible directly through the Supplier's Web Server or application server. The Customer Information Database 1091 stores all of the customer information that the supplier needs to complete a transaction or maintain customer records.

Figure 10B:
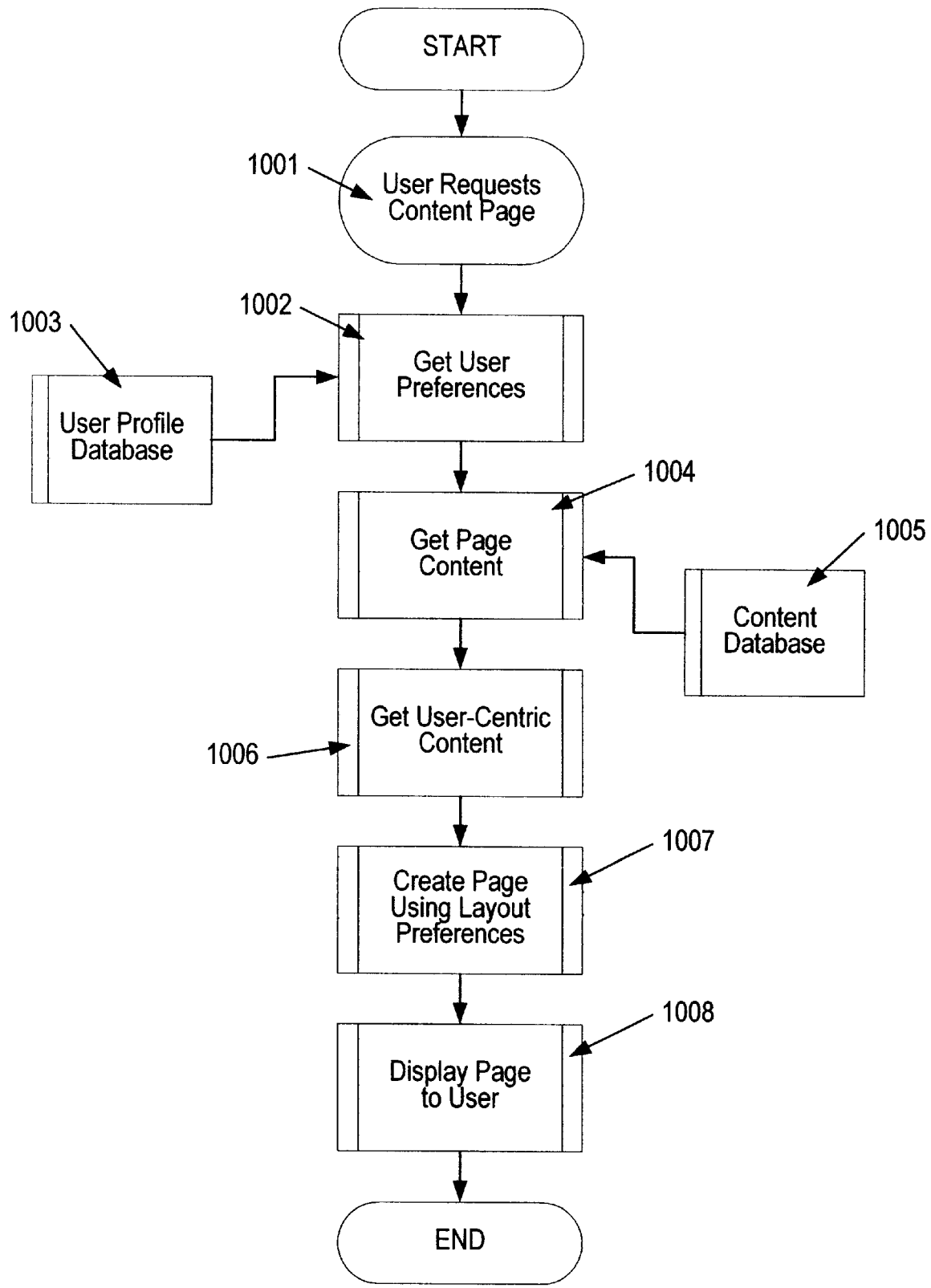

FIG. 10B is a flowchart providing the logic utilized to create a web page within the Egocentric Interface. The environment assumes a web server and a web browser connected through a TCP/IP network, such as over the public Internet or a private Intranet. Possible web servers could include Microsoft Internet Information Server, Netscape Enterprise Server or Apache. Possible web browsers include Microsoft Internet Explorer or Netscape Navigator. The client (i.e. web browser) makes a request 1001 to the server (i.e. web server) for a particular web page. This is usually accomplished by a user clicking on a button or a link within a web page. The web server gets the layout and content preferences 1002 for that particular user, with the request to the database keyed off of a unique user id stored in the client (i.e. web browser) and the User profile database 1003. The web server then retrieves the content 1004 for the page that has been requested from the content database 1005. The relevant user-centric content, such as calendar, email, contact list, and task list items are then retrieved 1006. (See FIG. 11 for a more detailed description of this process.) The query to the database utilizes the user content preferences stored as part of the user profile in the User profile database 1003 to filter the content that is returned. The content that is returned is then formatted into a web page 1007 according to the layout preferences defined in the user profile. The web page is then returned to the client and displayed to the user 1008.

Figure 11:
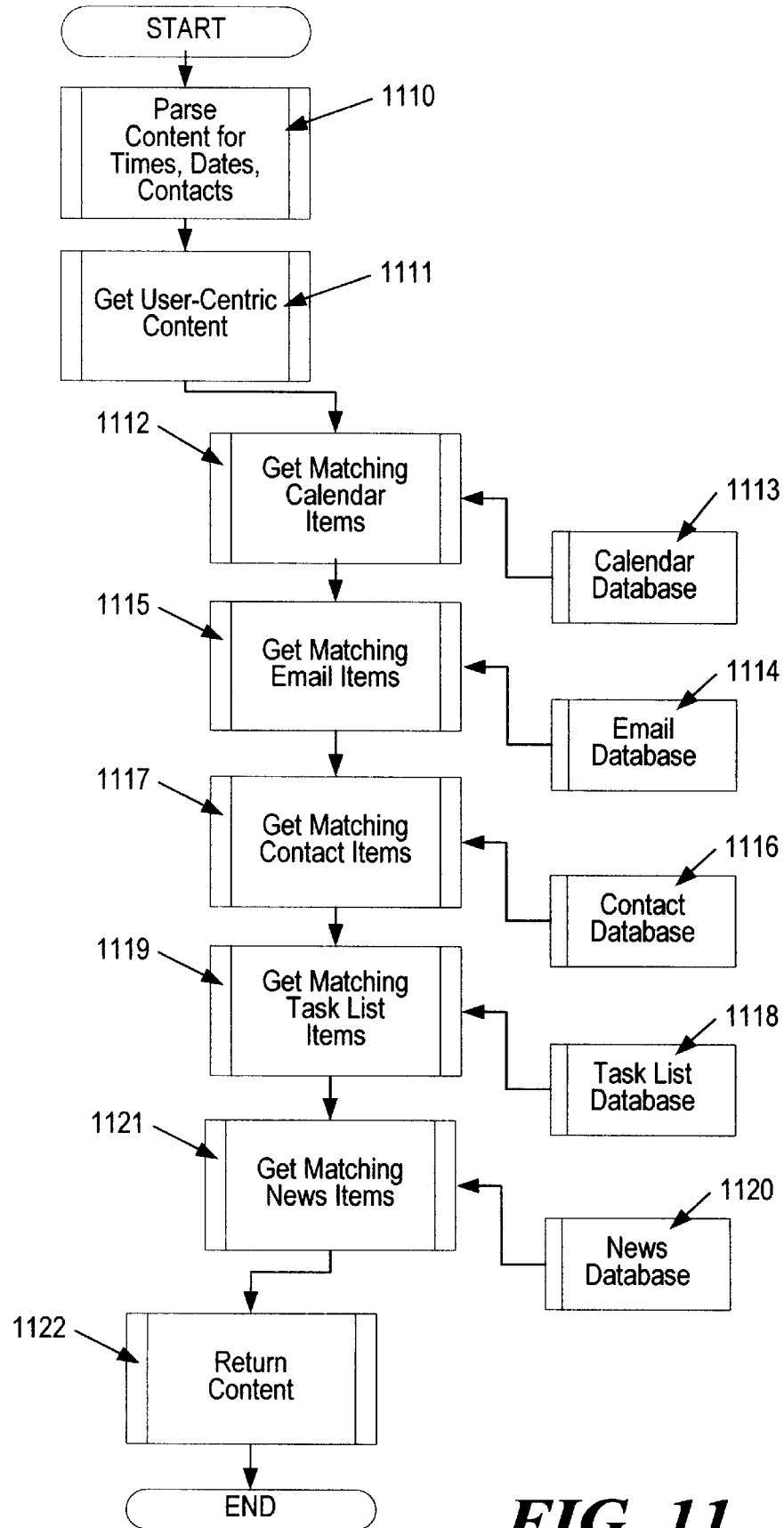
FIG. 11 is a flowchart depicting the detailed logic associated with retrieving user- centric content in accordance with a preferred embodiment.

FIG. 11 describes the process of retrieving user-centric content to add to a web page. This process describes 1006 in FIG. 10B in a more detailed fashion. It assumes that the server already has obtained the user profile and the existing content that is going to be integrated into this page. The server parses 1110 the filtered content, looking for instances of events, contact names and email addresses. If any of these are found, they are tagged and stored in a temporary holding space. Then, the server tries to find any user-centric content 1120 stored in various databases. This involves matching the tagged items in the temporary storage space with calendar items 1130 in the Calendar Database 1140; email items 1115 in the Email Database 1114; contact items 1117 in the Contact Database 1168; task list items 1119 in the Task List Database 1118; and news items 1121 in the News Database 1120. After retrieving any relevant user-centric content, it is compiled together and returned 1122.

User Persona

The system allows the user to create a number of different personas that aggregate profile information into sets that are useful in different contexts. A user may create one persona when making purchases for his home. This persona may contain his home address and may indicate that this user is looking to find a good bargain when shopping. The same user may create a second persona that can be used when he is in a work context. This persona may store the user's work address and may indicate that the user prefers certain vendors or works for a certain company that has a discount program in place. When shopping for work-related items, the user may use this persona. A persona may also contain rules and restrictions. For instance, the work persona may restrict the user to making airline reservations with only one travel agent and utilizing booking rules set up by his employer.

Figure 12:
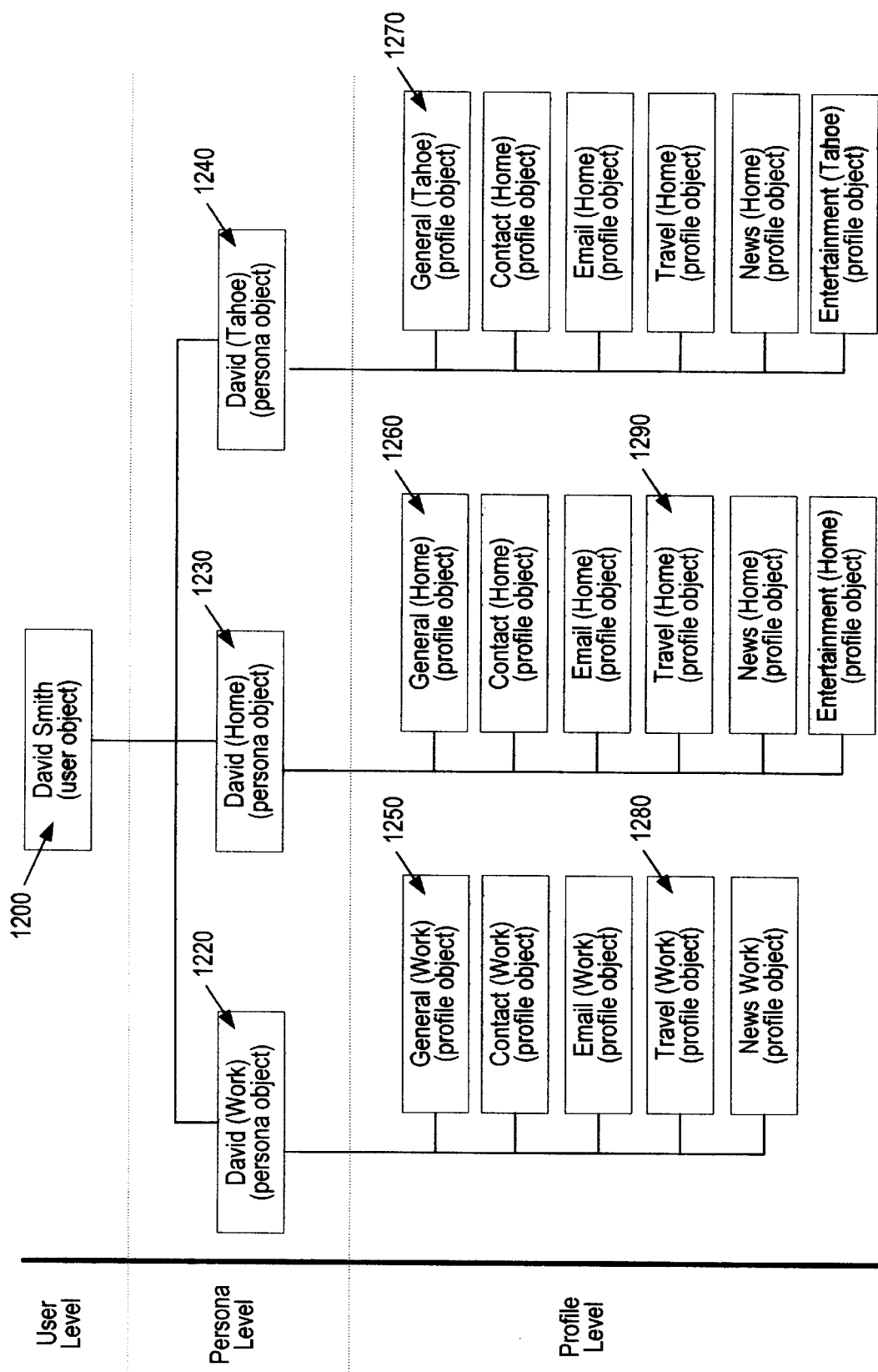
FIG. 12 is a data model of a user profile in accordance with a preferred embodiment.

FIG. 12 describes the relationship between a user, his multiple personas and his multiple profiles. At the User Level is the User Profile 1200. This profile describes the user and his account information. There is one unique record in the database for each user who has an account. Attached to each user are multiple Personas 1220, 1230 & 1240. These Personas are used to group multiple Profiles into useful contexts. For instance, consider a user who lives in San Francisco and works in Palo Alto, but has a mountain cabin in Lake Tahoe. He has three different contexts in which he might be accessing his site. One context is work-related. The other two are home-life related, but in different locations. The user can create a Persona for Work 1220, a Persona for Home 1230, and a Persona for his cabin home 1240. Each Persona references a different General Profile 1250, 1260 and 1270 which contains the address for that location. Hence, there are three General Profiles. Each Persona also references one of two Travel Profiles. The user maintains a Work Travel Profile 1280 that contains all of the business rules related to booking tickets and making reservations. This Profile may specify, for instance, that this person only travels in Business or First Class and his preferred airline is United Airlines. The Work Persona references this Work Travel Profile. The user may also maintain a Home Travel Profile 1290 that specifies that he prefers to travel in coach and wants to find non-refundable fairs, since they are generally cheaper. Both the Persona for Home and the Persona for the cabin home point to the Home Travel Profile.

Figure 13:
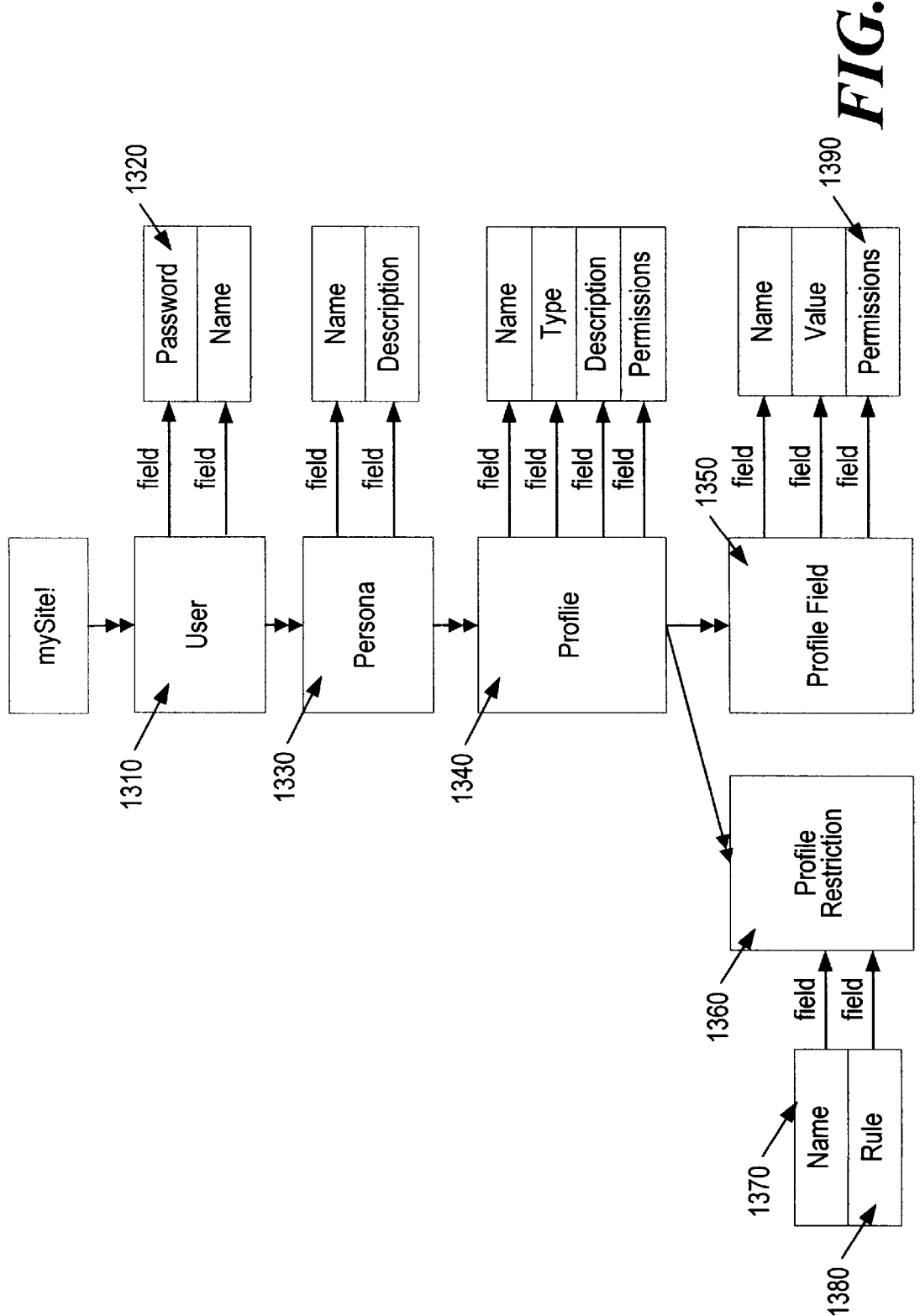
FIG. 13 is a persona data model in accordance with a preferred embodiment.

FIG. 13 describes the data model that supports the Persona concept. The user table 1310 contains a record for each user who has an account in the system. This table contains a username and a password 1320 as well as a unique identifier. Each user can have multiple Personas 1330, which act as containers for more specialized structures called Profiles 1340. Profiles contain the detailed personal information in Profile Field 1350 records. Attached to each Profile are sets of Profile Restriction 1360 records. These each contain a Name 1370 and a Rule 1380, which define the restriction. The Rule is in the form of a pattern like (if x then y), which allows the Rule to be restricted to certain uses. An example Profile Restriction would be the rule that dictates that the user cannot book a flight on a certain airline contained in the list. This Profile Restriction could be contained in the "Travel" Profile of the "Work" Persona set up by the user's employer, for instance. Each Profile Field also contains a set of Permissions 1390 that are contained in that record. These permissions dictate who has what access rights to that particular Profile Field's information.

Intention-Centric Interface

Satisfying Customer Intentions, such as Planning for Retirement or Relocating requires a specialized interface. Customer Intentions require extensive planning and coordination across many areas, ranging from financial security, housing and transportation to healthcare, personal and professional development, and entertainment, among others. Satisfying Intentions requires a network of complementary businesses, working across industries, to help meet consumers' needs.

An Intention-Centric Interface is a user interface designed to help the user manage personal Intentions. At any given point, the interface content is customized to show only content that relates to that particular Intention. The Intention-Centric Interface allows the user to manage the process of satisfying that particular Intention. This involves a series of discrete steps and a set of content areas the user can access. At any point, the user can also switch the interface to manage a different Intention, and this act will change the content of the interface to include only that content which is relevant to the satisfaction of the newly selected Intention.

Figure 14:
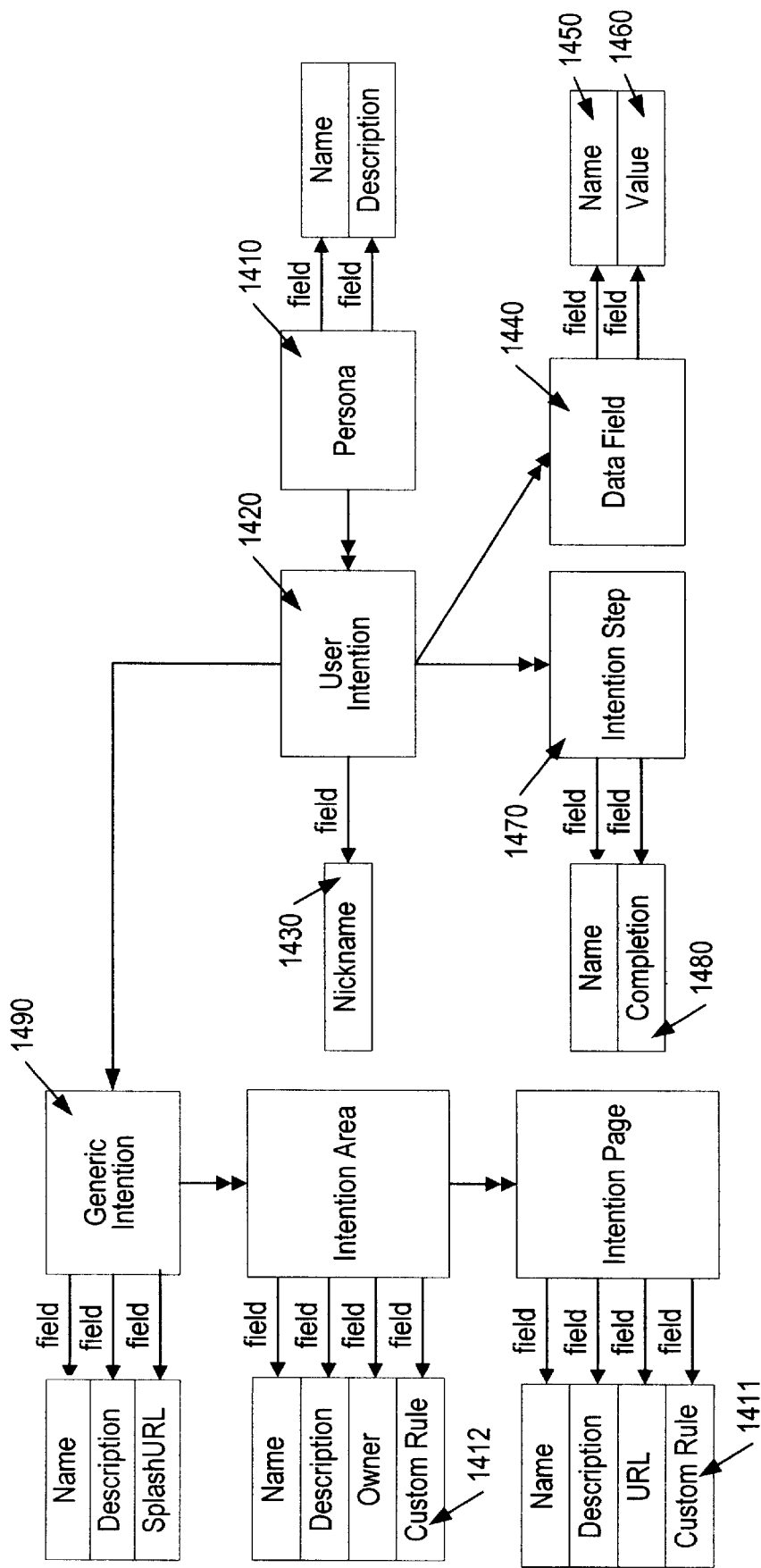
FIG. 14 is an intention data model in accordance with a preferred embodiment.

FIG. 14 provides a detailed description of the data model needed to support an Intention-Centric Interface. Each User Persona 1410 (see FIG. 13 for a more detailed description of the Persona data model.) has any number of active User Intentions 1420. Each active User Intention is given a Nickname 1430, which is the display name the user sees on the screen. Each active User Intention also contains a number of Data Fields 1440, which contain any user data collected throughout the interaction with the user. For instance, if the user had filled out a form on the screen and one of the fields was Social Security Number, the corresponding Data Field would contain Name="SSN" 1450, Value="999-99-9999" 1460. Each User Intention also keeps track of Intention Step 1470 completion status. The Completion 1480 field indicates whether the user has completed the step. Every User Intention is a user-specific version of a Generic Intention 1490, which is the default model for that Intention for all users. The Generic Intention is customized through Custom Rules 1411 and 1412 that are attached to the sub-steps in the Intention. These Custom Rules are patterns describing how the system will customize the Intention for each individual user using the individual user's profile information.

Statistical Agent

An agent keeps track of key statistics for each user. These statistics are used in a manner similar to the Tamagochi virtual reality pet toy to encourage certain behaviors from the user. The statistics that are recorded are frequency of login, frequency of rating of content such as news articles, and activity of agents, measured by the number of tasks which it performs in a certain period. This information is used by the system to emotionally appeal to the user to encourage certain behaviors.

Figure 15:
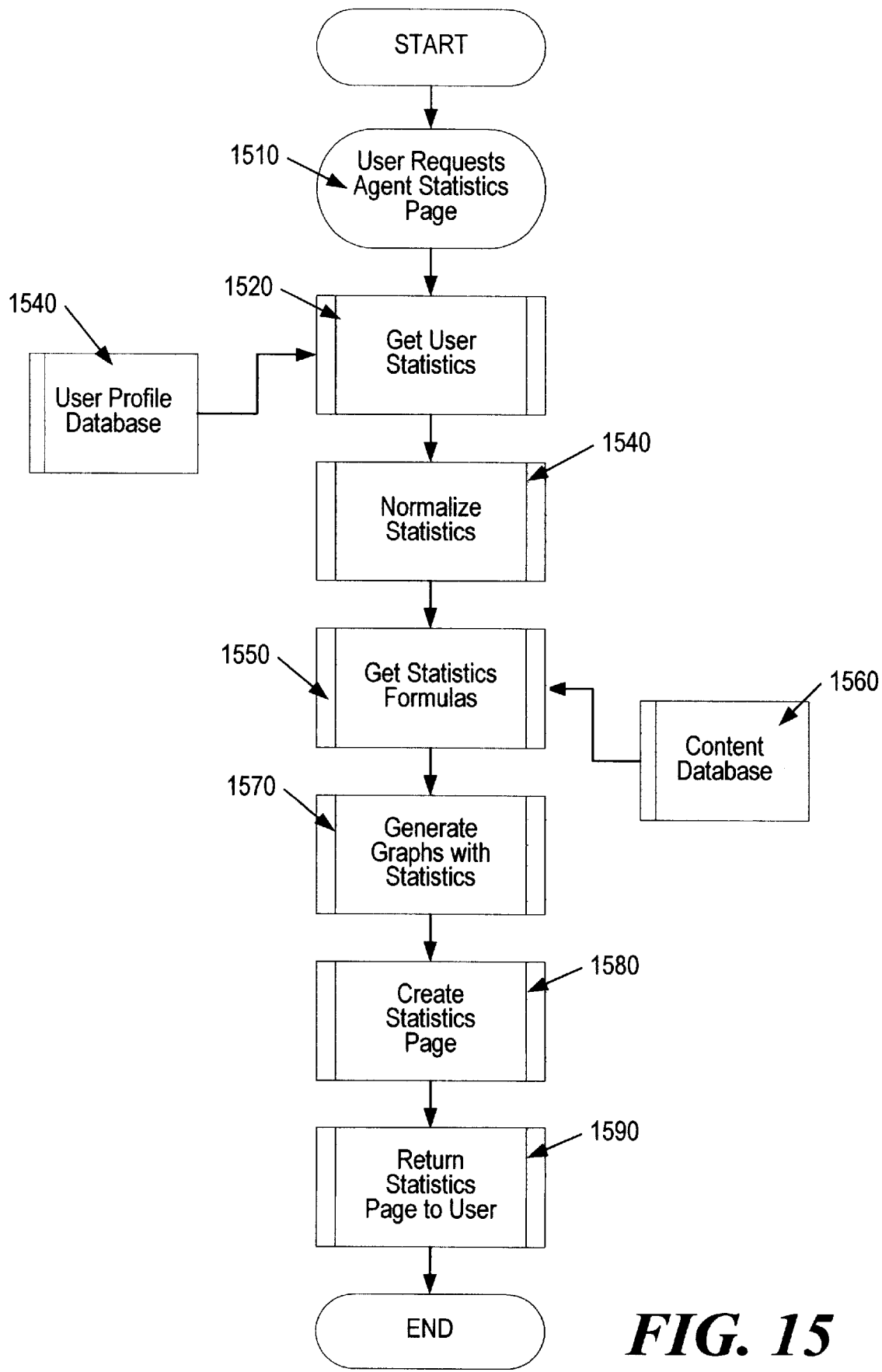
FIG. 15 is a flowchart of the processing for generating an agent's current statistics in accordance with a preferred embodiment.

FIG. 15 describes the process for generating the page that displays the agent's current statistics. When the user requests the agent statistics page 1510 with the client browser, the server retrieves the users' statistics 1520 from the users' profile database 1530. The server then performs the mathematical calculations necessary to create a normalized set of statistics 1540. The server then retrieves the formulas 1550 from the content database 1560 that will be used to calculate the user-centric statistics. Graphs are then generated 1570 using the generic formulas and that user's statistics. These graphs are inserted into a template to create the statistics page 1580. This page is then returned to the user 1590.

Personalized Product Report Service

The system provide Consumer Report-like service that is customized for each user based on a user profile. The system records and provides ratings from users about product quality and desirability on a number of dimensions. The difference between this system and traditional product quality measurement services is that the ratings that come back to the users are personalized. This service works by finding the people who have the closest match to the user's profile and have previously rated the product being asked for. Using this algorithm will help to ensure that the product reports sent back to the user only contain statistics from people who are similar to that user.

Figure 16:
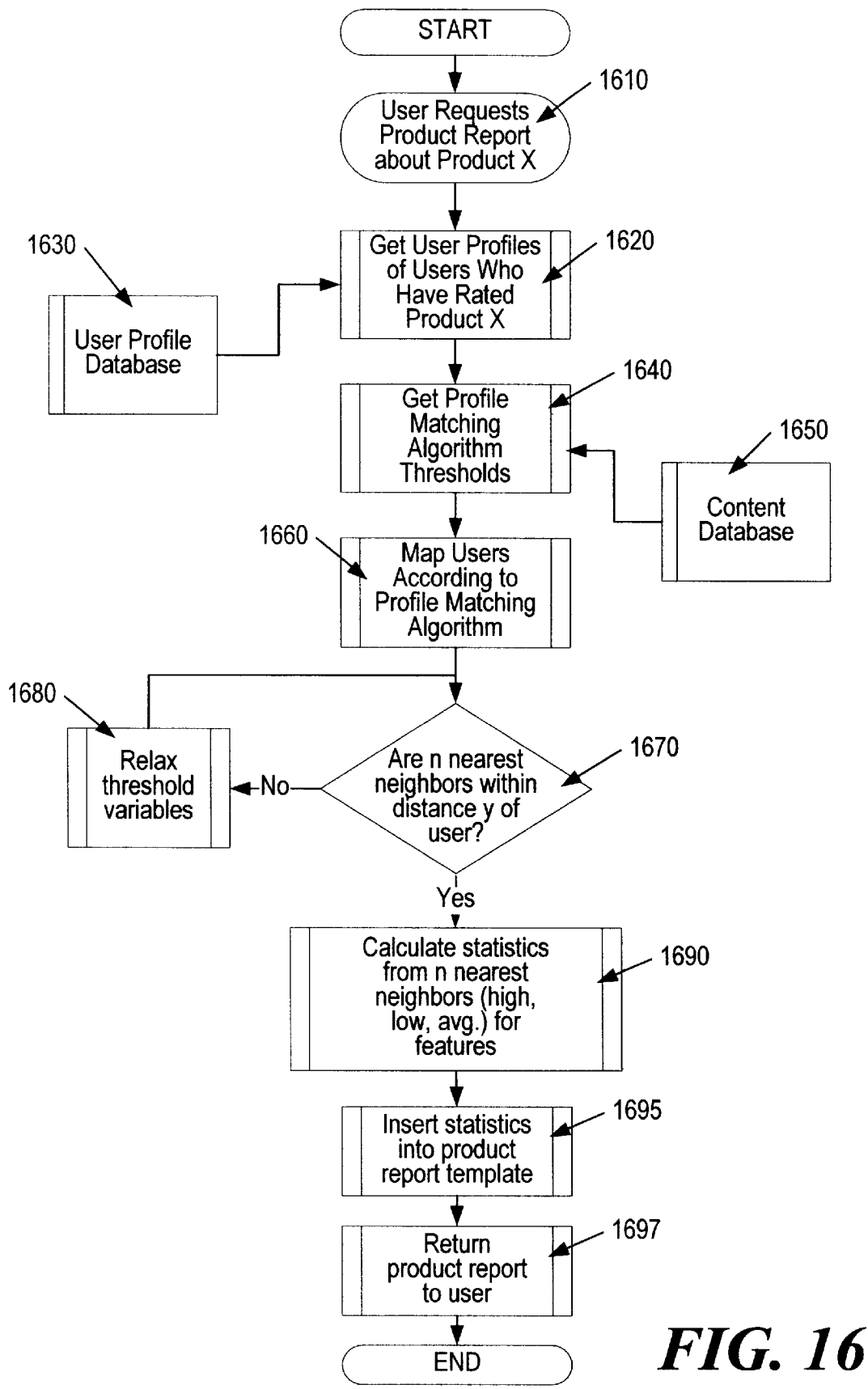
FIG. 16 is a flowchart of the logic that determines the personalized product rating for a user in accordance with a preferred embodiment.

FIG. 16 describes the algorithm for determining the personalized product ratings for a user. When the user requests a product report 1610 for product X, the algorithm retrieves the profiles 1620 from the profile database 1630 (which includes product ratings) of those users who have previously rated that product. Then the system retrieves the default thresholds 1640 for the profile matching algorithm from the content database 1650. It then maps all of the short list of users along several dimensions specified in the profile matching algorithm 1660. The top n (specified previously as a threshold variable) nearest neighbors are then determined and a test is performed to decide if they are within distance y (also specified previously as a threshold variable) of the user's profile in the set 1670 using the results from the profile matching algorithm. If they are not within the threshold, then the threshold variables are relaxed 1680, and the test is run again. This processing is repeated until the test returns true. The product ratings from the smaller set of n nearest neighbors are then used to determine a number of product statistics 1690 along several dimensions. Those statistics are inserted into a product report template 1695 and returned to the user 1697 as a product report.

Personal Profile and Services Ubiquity

This system provides one central storage place for a person's profile. This storage place is a server available through the public Internet, accessible by any device that is connected to the Internet and has appropriate access. Because of the ubiquitous accessibility of the profile, numerous access devices can be used to customize services for the user based on his profile. For example, a merchant's web site can use this profile to provide personalized content to the user. A Personal Digital Assistant (PDA) with Internet access can synchronize the person's calendar, email, contact list, task list and notes on the PDA with the version stored in the Internet site. This enables the person to only have to maintain one version of this data in order to have it available whenever it is needed and in whatever formats it is needed.

Figure 17:
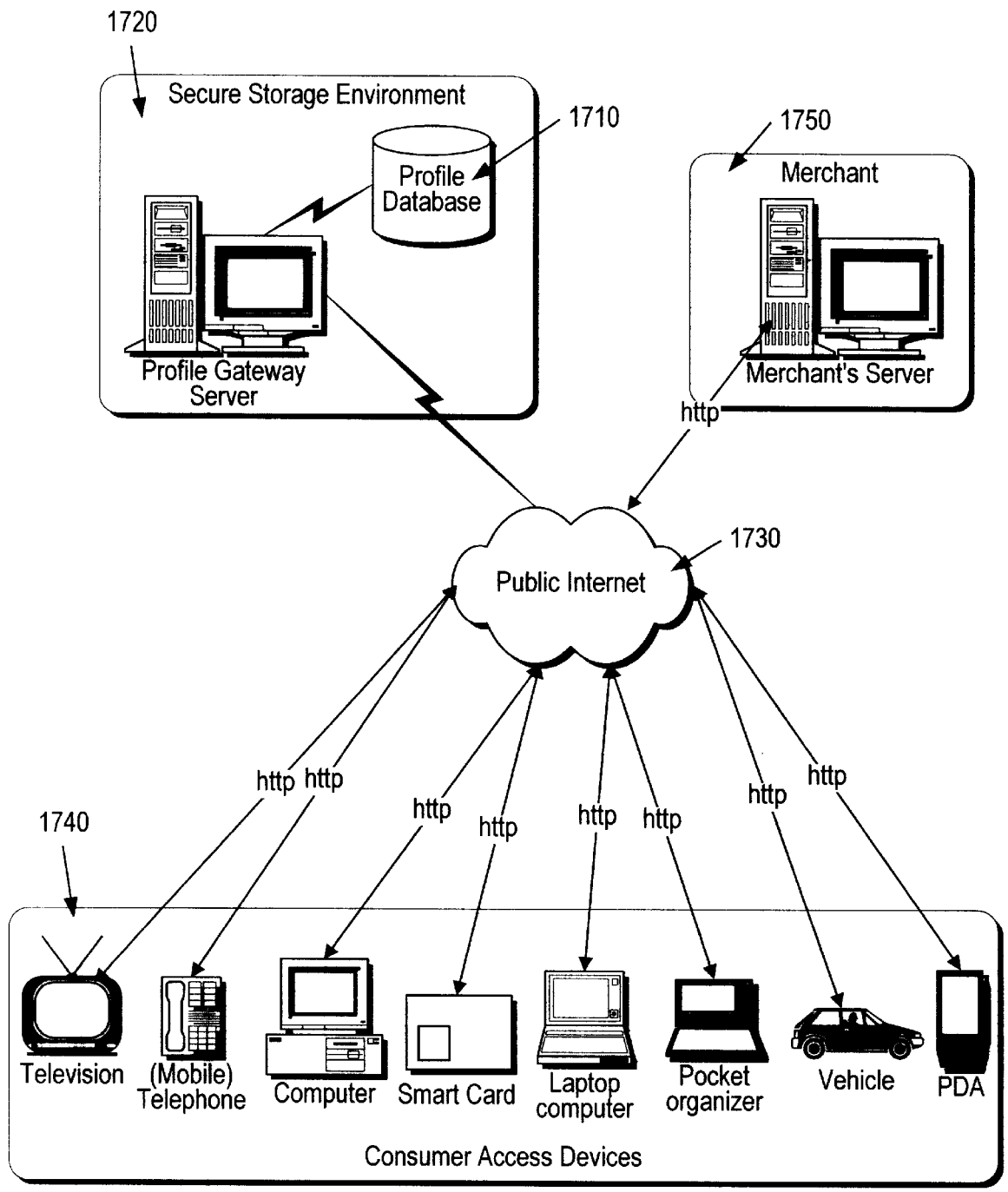
FIG. 17 is a flowchart of the logic for accessing the centrally stored profile in accordance with a preferred embodiment.

FIG. 17 presents the detailed logic associated with the many different methods for accessing this centrally stored profile. The profile database 1710 is the central storage place for the users' profile information. The profile gateway server 1720 receives all requests for profile information, whether from the user himself or merchants trying to provide a service to the user. The profile gateway server is responsible for ensuring that information is only given out when the profile owner specifically grants permission. Any device that can access the public Internet 1730 over TCP/IP (a standard network communications protocol) is able to request information from the profile database via intelligent HTTP requests. Consumers will be able to gain access to services from devices such as their televisions 1740, mobile phones, Smart Cards, gas meters, water meters, kitchen appliances, security systems, desktop computers, laptops, pocket organizers, PDAs, and their vehicles, among others. Likewise, merchants 1750 will be able to access those profiles (given permission from the consumer who owns each profile), and will be able to offer customized, personalized services to consumers because of this.

One possible use of the ubiquitous profile is for a hotel chain. A consumer can carry a Smart Card that holds a digital certificate uniquely identifying him. This Smart Card's digital certificate has been issued by the system and it recorded his profile information into the profile database. The consumer brings this card into a hotel chain and checks in. The hotel employee swipes the Smart Card and the consumer enters his Pin number, unlocking the digital certificate. The certificate is sent to the profile gateway server (using a secure transmission protocol) and is authenticated. The hotel is then given access to a certain part of the consumer's profile that he has previously specified. The hotel can then retrieve all of the consumer's billing information as well as preferences for hotel room, etc. The hotel can also access the consumer's movie and dining preferences and offer customized menus for both of them. The hotel can offer to send an email to the consumer's spouse letting him/her know the person checked into the hotel and is safe. All transaction information can be uploaded to the consumer's profile after the hotel checks him in. This will allow partners of the hotel to utilize the information about the consumer that the hotel has gathered (again, given the consumer's permission).

Intention Value Network

In an Intention Value Network, the overall integrator system coordinates the delivery of products and services for a user. The integrator manages a network of approved suppliers providing products and services, both physical and virtual, to a user based on the user's preferences as reflected in the user's profile. The integrator manages the relationship between suppliers and consumers and coordinates the suppliers' fulfillment of consumers' intentions. It does this by providing the consumer with information about products and suppliers and offering objective advice, among other things.

Figure 18:
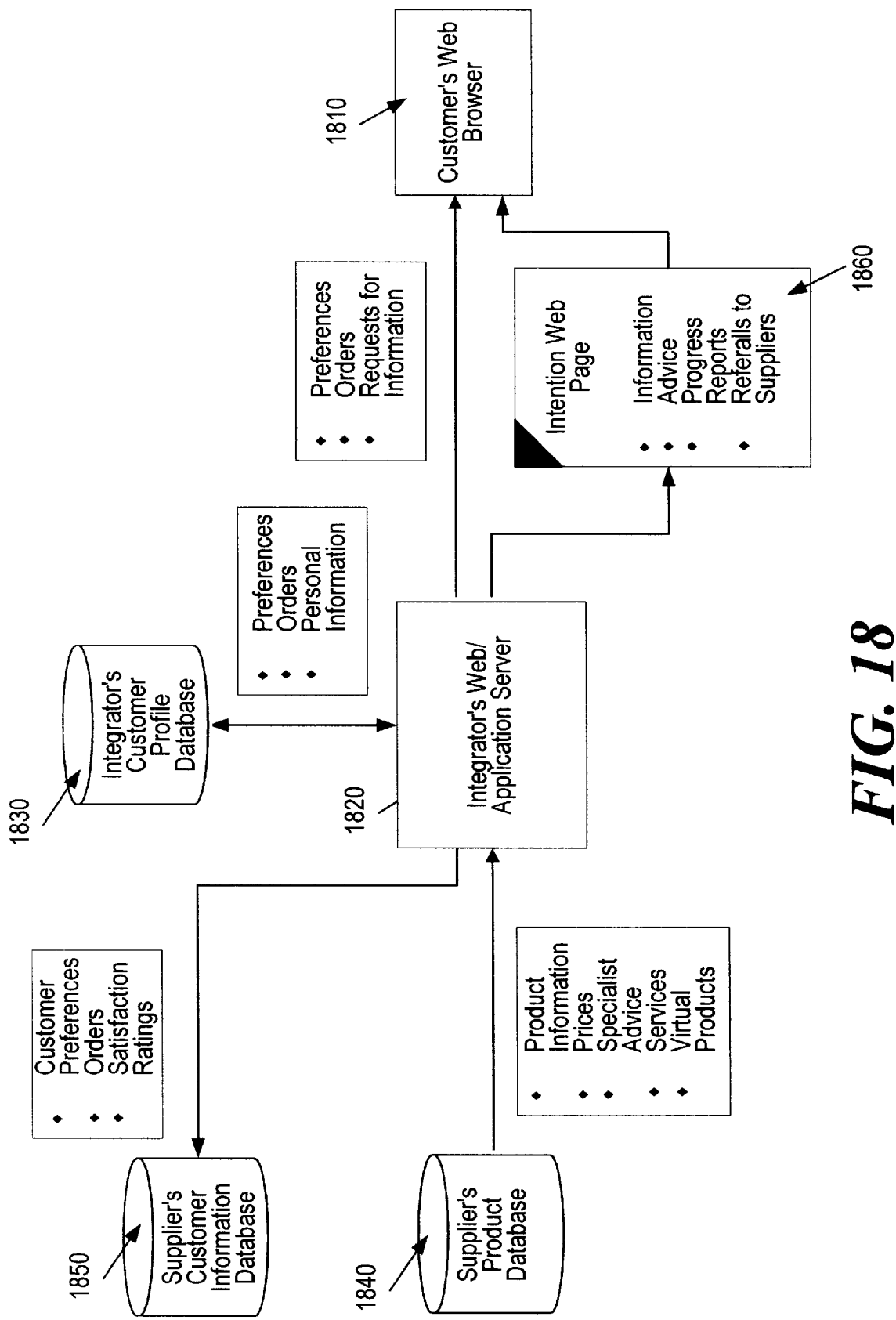
FIG. 18 is a flowchart of the interaction logic between a user and the integrator for a particular supplier in accordance with a preferred embodiment.

FIG. 18 discloses the detailed interaction between a consumer and the integrator involving one supplier. The user accesses a Web Browser 1810 and requests product and pricing information from the integrator. The request is sent from the user's browser to the integrator's Web/Application Server 1820. The user's preferences and personal information is obtained from an integrator's customer profile database 1830 and returned to the Web/Application server. The requested product information is extracted from the supplier's product database 1840 and customized for the particular customer. The Web/Application server updates the supplier's customer information database 1850 with the inquiry information about the customer. The product and pricing information is then formatted into a Web Page 1860 and returned to the customer's Web Browser.

Summary Agent

A suite of software agents running on the application and web servers are programmed to take care of repetitive or mundane tasks for the user. The agents work according to rules set up by the user and are only allowed to perform tasks explicitly defined by the user. The agents can take care of paying bills for the user, filtering content and emails, and providing a summary view of tasks and agent activity. The user interface for the agent can be modified to suit the particular user.

Figure 19:
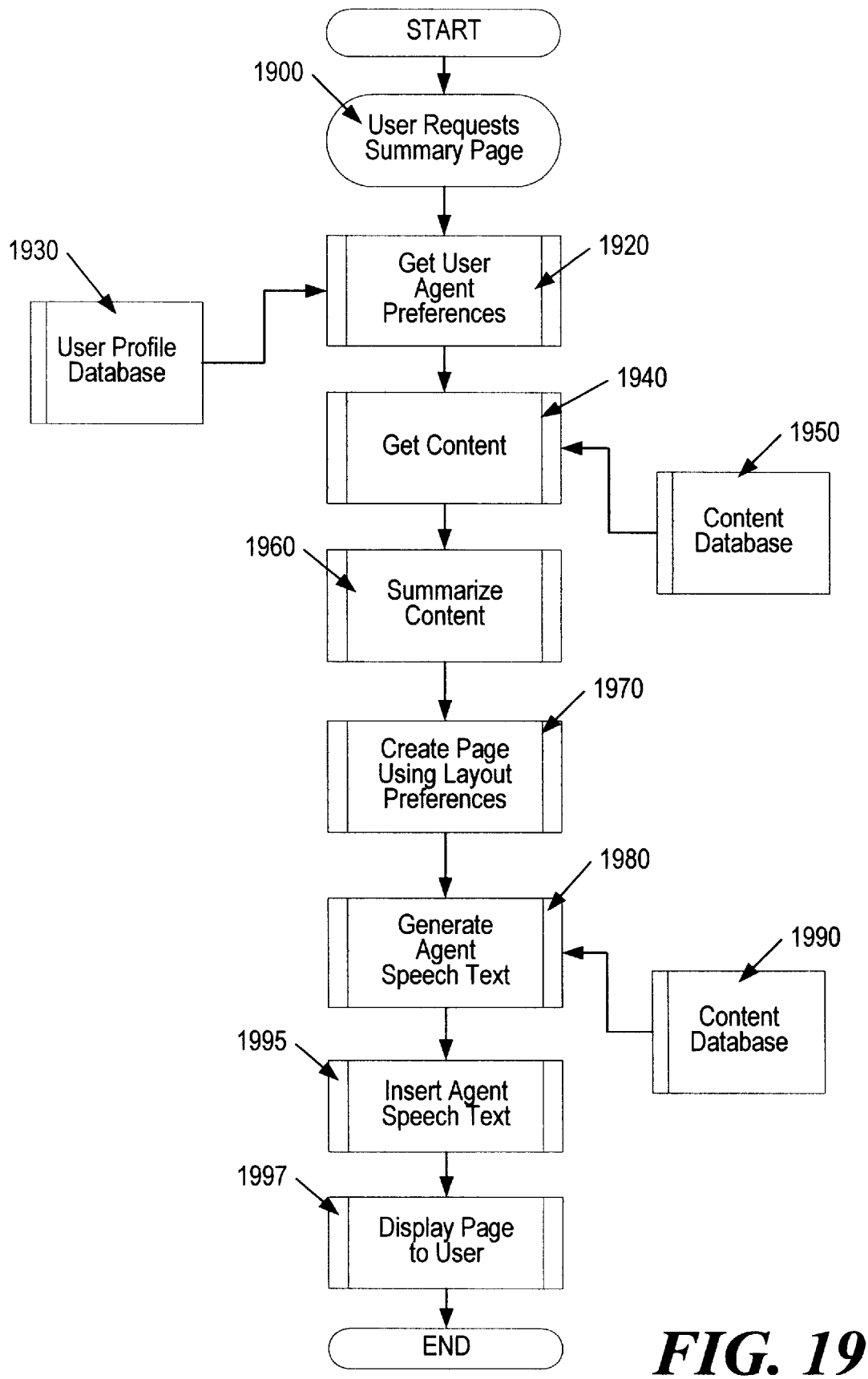
FIG. 19 is a flowchart of the agent processing for generating a verbal summary in accordance with a preferred embodiment.

FIG. 19 discloses the logic in accordance with a preferred embodiment processing by an agent to generate a verbal summary for the user. When the user requests the summary page 1900, the server gets the user's agent preferences 1920, such as agent type, rules and summary level from the user profile database 1930. The server gets the content 1940, such as emails, to do list items, news, and bills, from the content database 1950. The agent parses all of this content, using the rules stored in the profile database, and summarizes the content 1960. The content is formatted into a web page 1970 according to a template. The text for the agent's speech is generated 1980, using the content from the content database 1990 and speech templates stored in the database. This speech text is inserted into the web page 1995 and the page is returned to the user 1997.

Trusted Third Party

The above scenario requires the web site to maintain a guarantee of privacy of information according to a published policy. This system is the consumer's Trusted Third Party, acting on his behalf in every case, erring on the side of privacy of information, rather than on the side of stimulation of commerce opportunities. The Trusted Third Party has a set of processes in place that guarantee certain complicity with the stated policy.

"meCommerce"

Figure 20:
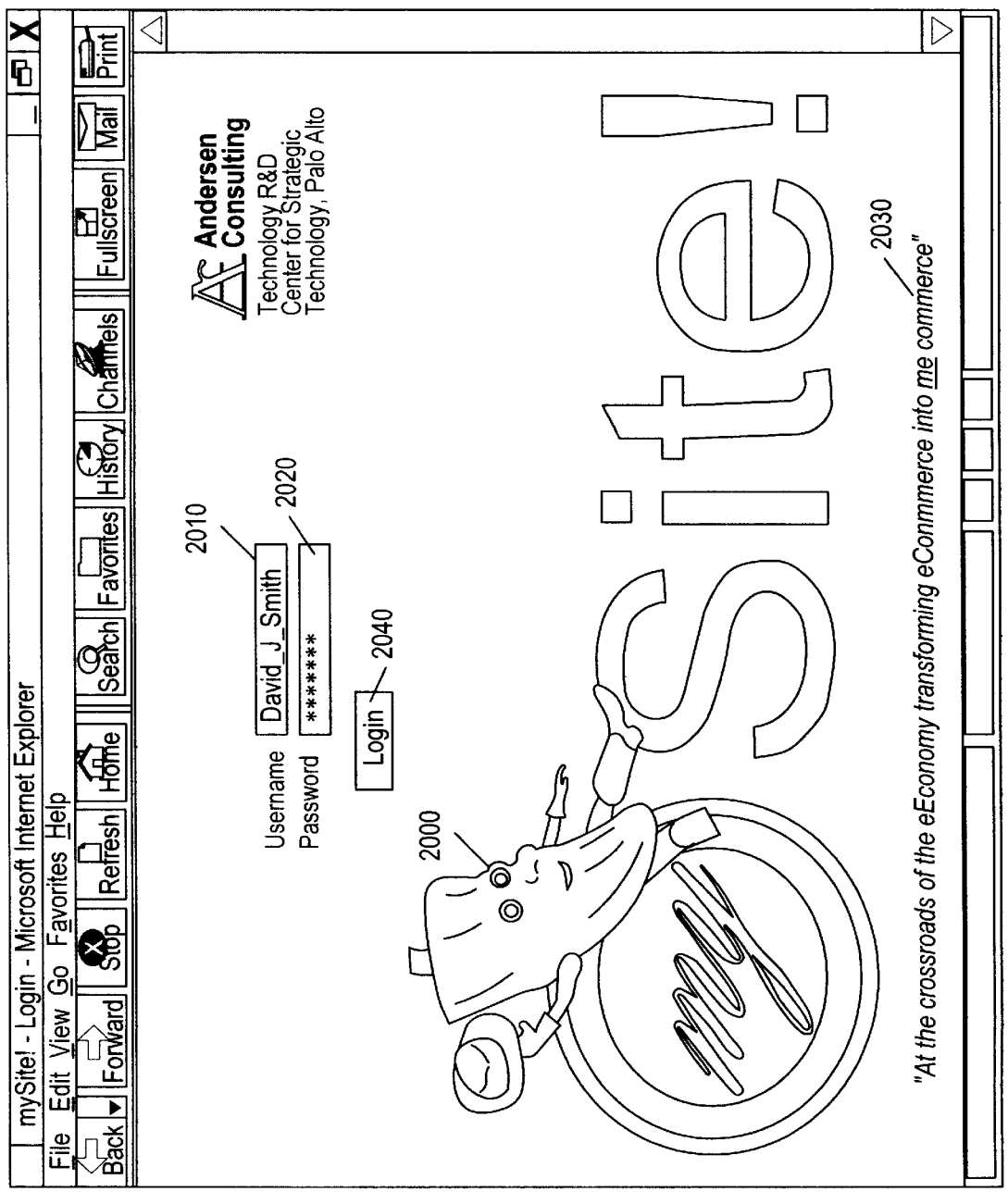
FIG. 20 illustrates a display login in accordance with a preferred embodiment.

This word extends the word "eCommerce" to mean "personalized electronic commerce." FIG. 20 illustrates a display login in accordance with a preferred embodiment. The display is implemented as a Microsoft Internet Explorer application with an agent 2000 that guides a user through the process of interacting with the system to customize and personalize various system components to gather information and interact with the user's personal requirements. A user enters a username at 2010 and a password at 2020 and selects a button 2040 to initiate the login procedure. As the logo 2030 suggests, the system transforms electronic commerce into a personalized, so called "me" commerce.

Figure 21:
FIG. 21 illustrates a managing daily logistics display in accordance with a preferred embodiment.

FIG. 21 illustrates a managing daily logistics display in accordance with a preferred embodiment. A user is greeted by an animated agent 2100 with a personalized message 2190. The user can select from various activities based on requirements, including travel 2110, household chores 2120, finances 2130 and marketplace activities 2140. Icons 2142 for routine tasks such as e-mail, calendaring and document preparation are also provided to facilitate rapid navigation from one activity to another. Direct links 2146 are also provided to allow transfer of news and other items of interest. Various profiles can be selected based on where the user is located. For example, work, home or vacation. The profiles can be added 2170 as a user requires a new profile for another location. Various items 2180 of personal information are collected from the user to support various endeavors. Moreover, permissions 2150 are set for items 2180 to assure information is timely and current.

Figure 22:
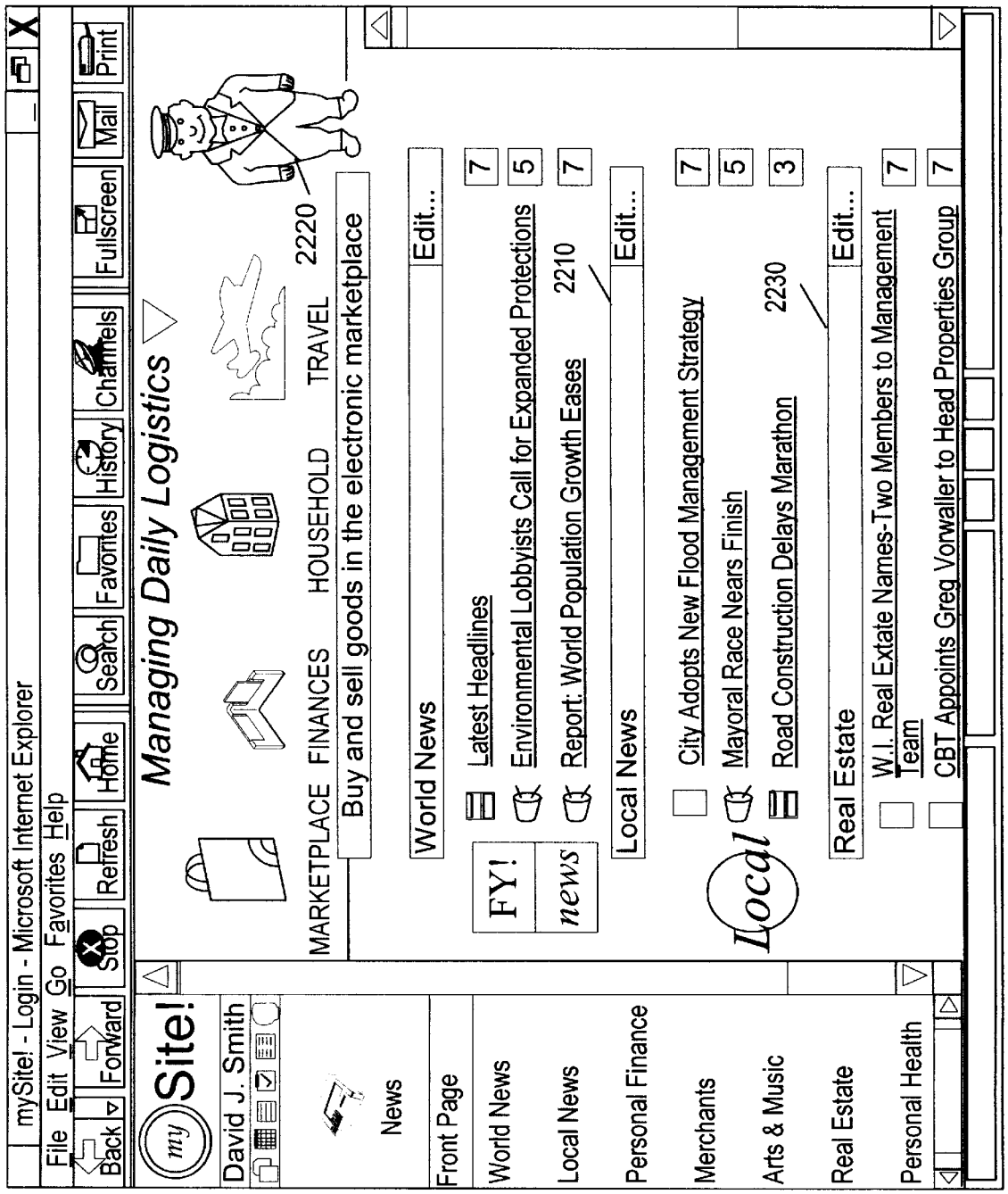
FIG. 22 illustrates a user main display in accordance with a preferred embodiment.

FIG. 22 illustrates a user main display in accordance with a preferred embodiment. World 2200 and local news 2210 is provided based on a user's preference. The user has also selected real estate 2230 as an item to provide direct information on the main display. Also, a different agent 2220 is provided based on the user's preference.

Figure 23:
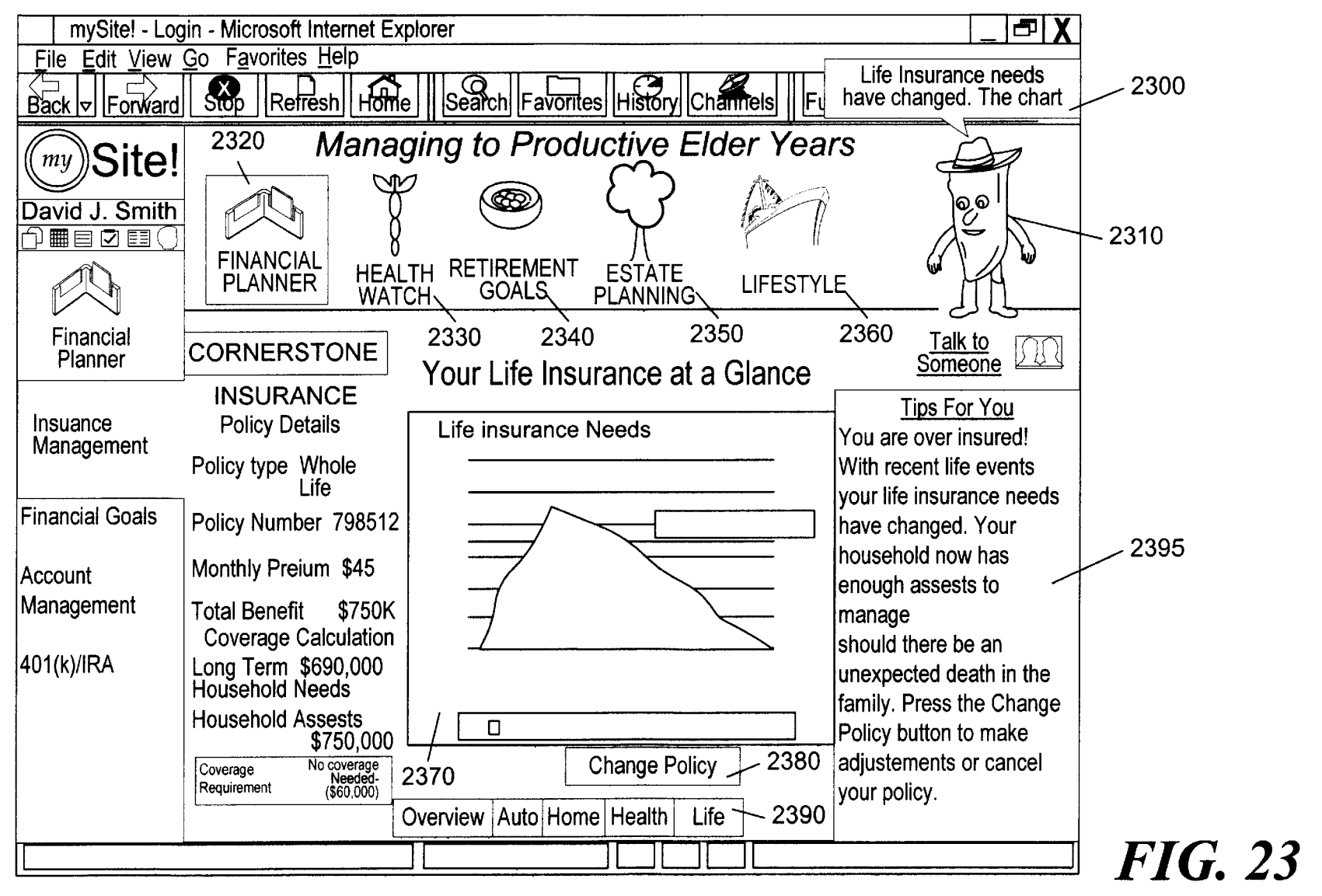

FIG. 23 illustrates an agent interaction in accordance with a preferred embodiment.

The agent 2310 is communicating information 2300 to a user indicating that the user's life insurance needs have changed and pointing the user to the chart that best summarizes the information for the user. Particular tips 2395 are provided to facilitate more detailed information based on current user statistics. A chart 2370 of the user's life insurance needs is also highlighted at the center of the display to assist the user in determining appropriate action. A button 2380 is provided to facilitate changing the policy and a set of buttons 2390 are provided to assist a user in selecting various views of the user's insurance requirements.

Event Backgrounder

An Event Backgrounder is a short description of an upcoming event that is sent to the user just before an event. The Event Backgrounder is constantly updated with the latest information related to this event. Pertinent information such as itinerary and logistics are included, and other useful information, such as people the user knows who might be in the same location, are also included. The purpose of the Event Backgrounder is to provide the most up-to-date information about an event, drawing from a number of resources, such as public web sites and the user's calendar and contact lists, to allow the user to react optimally in a given situation.

Vicinity Friend Finder

This software looks for opportunities to tell the user when a friend, family member or acquaintance is or is going to be in the same vicinity as the user. This software scans the user's calendar for upcoming events. It then uses a geographic map to compare those calendar events with the calendar events of people who are listed in his contact list. It then informs the user of any matches, thus telling the user that someone is scheduled to be near him at a particular time.

Information Overload

The term information overload is now relatively understood in both its definition as well as its implications and consequences. People have a finite amount of attention that is available at any one time, but there is more and more vying for that attention every day. In short, too much information and too little time are the primary factors complicating the lives of most knowledge workers today.

The first attempts to dynamically deal with information overload were primarily focused on the intelligent filtering of information such that the quantity of information would be lessened. Rather than simply removing random bits of information, however, most of these approaches tried to be intelligent about what information was ultimately presented to the user. This was accomplished by evaluating each document based on the user's interests and discarding the less relevant ones. It follows, therefore, that the quality was also increased.

Filtering the information is only a first step in dealing with information is this new age. Arguably, just as important as the quality of the document is having ready access to it. Once you have entered a meeting, a document containing critical information about the meeting subject delivered to your office is of little value. As the speed of business continues to increase fueled by the technologies of interconnectedness, the ability to receive quality information wherever and whenever you are becomes critical. This new approach is called intelligent information delivery and is heralding in a new information age.

A preferred embodiment demonstrates the intelligent information delivery theory described above in an attempt to not only reduce information overload, but to deliver high quality information where and when users' require it. In other words, the system delivers right information to the right person at the right time and the right place.

Active Knowledge Management System Description

Figure 24:
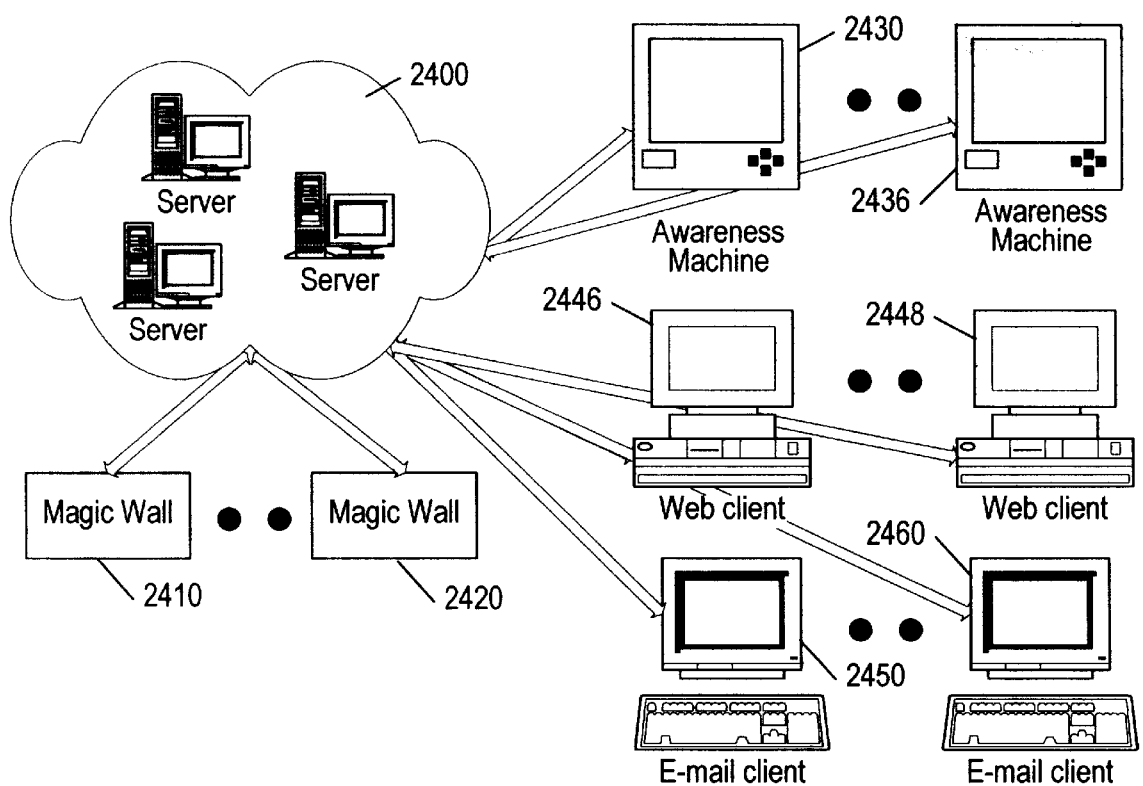
FIG. 24 is a block diagram of an active knowledge management system in accordance with a preferred embodiment.

FIG. 24 is a block diagram of an active knowledge management system in accordance with a preferred embodiment. The system consists of the following parts: back-end 2400 connection to one or more servers, personal mobile wireless clients (Awareness Machine)2430, 2436, public clients (Magic Wall) 2410, 2420, web clients 2446, 2448, e-mail clients 2450, 2460.

Back-end Server (2400) Processes

Figure 25:
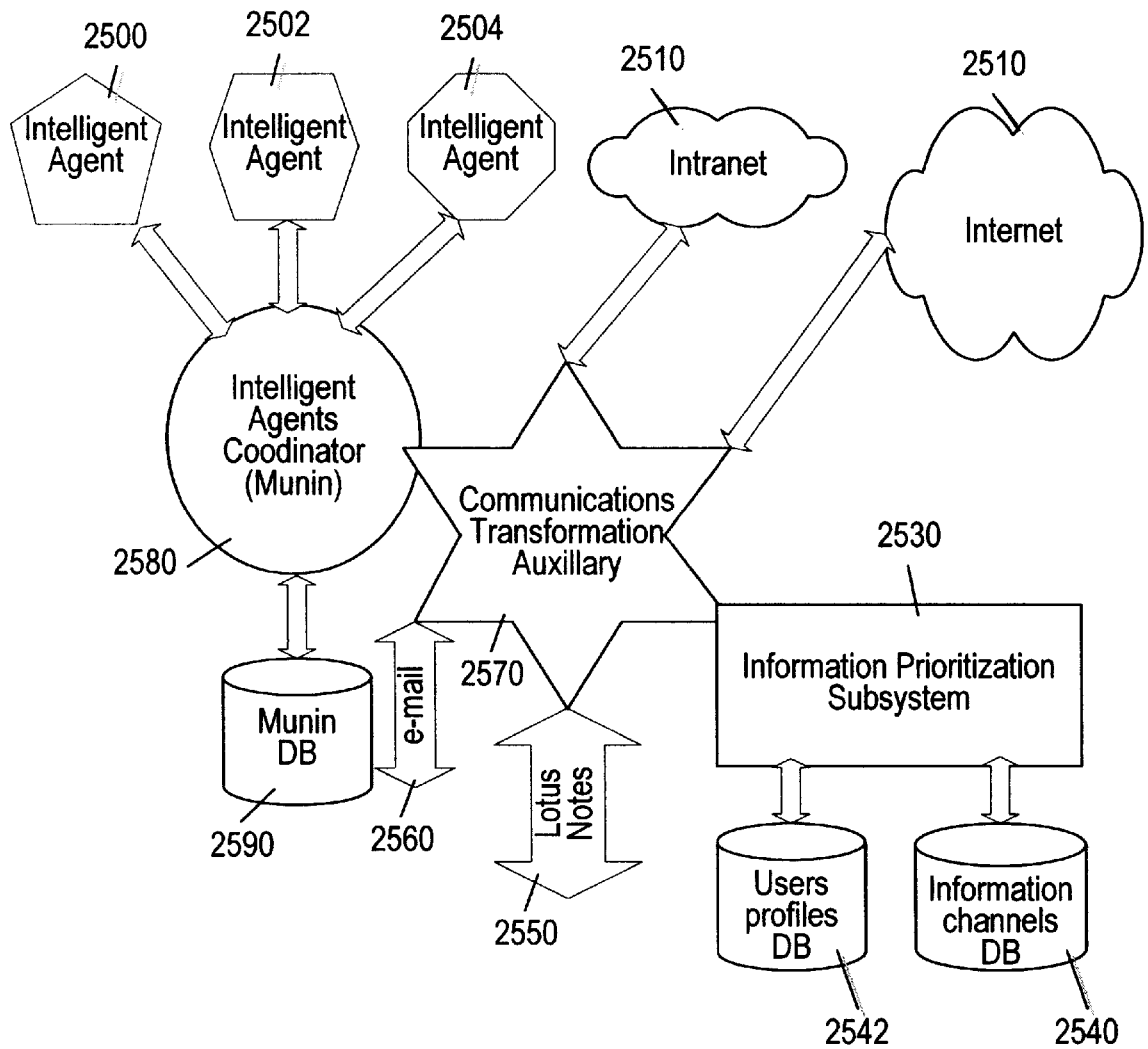
FIG. 25 is a block diagram of a back end server in accordance with a preferred embodiment.

FIG. 25 is a block diagram of a back end server in accordance with a preferred embodiment. The back-end (2400 of FIG. 24) is a computer system that has the following software active: Intelligent Agents Coordinator (Munin) 2580, Information Prioritization Subsystem 2530, a set of continuously and periodically running information gathering and processing Intelligent Agents 2500, 2502 and 2504, User Profiles Database 2542 and supporting software, Information Channels Database 2542 and supporting software, communications software 2550, information transformation software 2560, and auxiliary software.

The Awareness Machine (2446 & 2448 of FIG. 24)

The Awareness Machine is a combination of hardware device and software application. The hardware consists of handheld personal computer and wireless communications device. The Awareness Machine reflects a constantly updated state-of-the-owner's-world by continually receiving a wireless trickle of information. This information, mined and processed by a suite of intelligent agents, consists of mail messages, news that meets each user's preferences, schedule updates, background information on upcoming meetings and events, as well as weather and traffic. The Awareness Machine is covered by another patent application.

Figure 26:
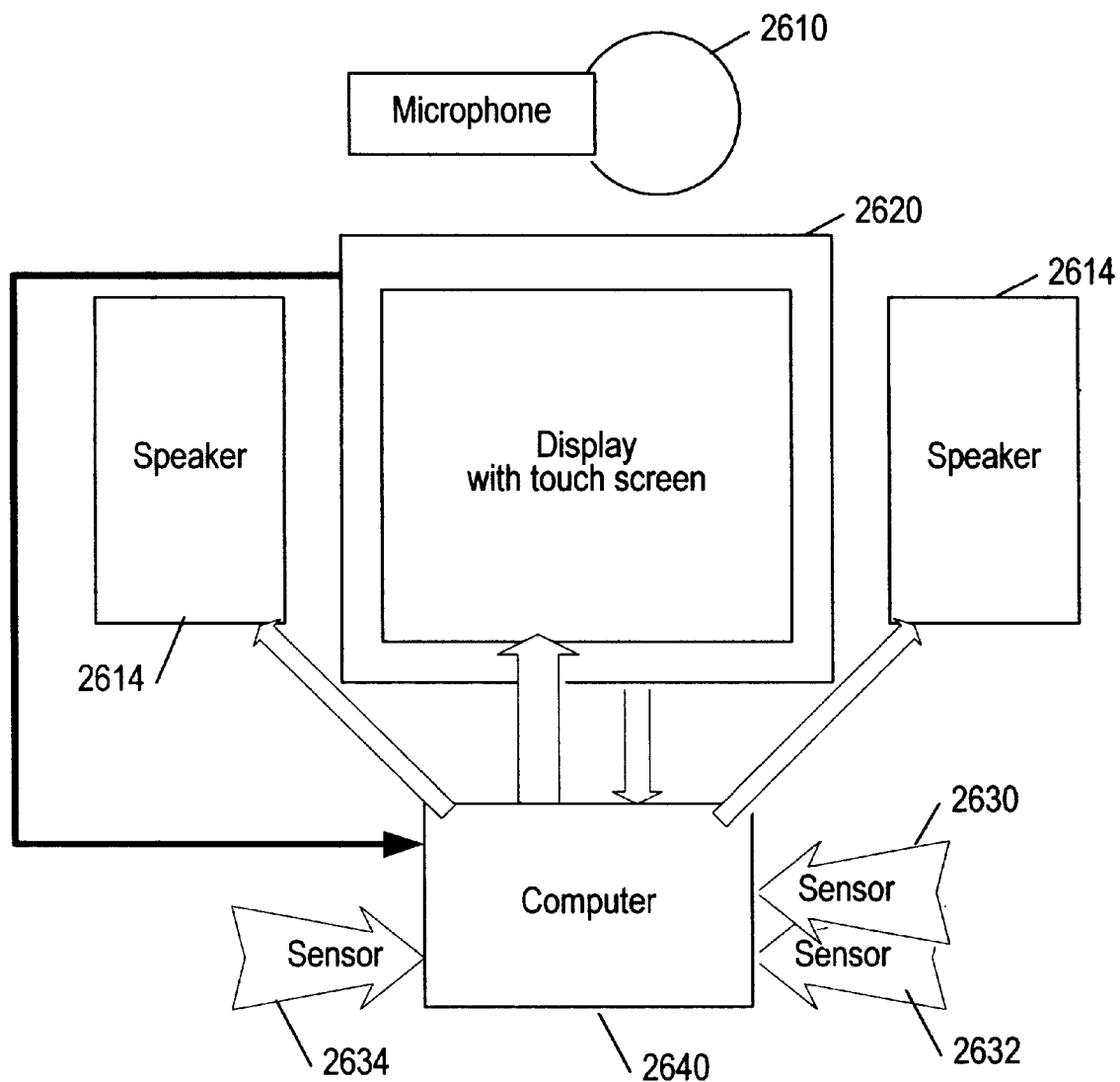
FIG. 26 is a block diagram of a magic wall in accordance with a preferred embodiment.

FIG. 26 is a block diagram of a magic wall in accordance with a preferred embodiment.

The Magic Wall

The Magic Wall hardware includes:

Computer system 2640 connected to the back-end server

Sensor array 2634, 2630 and 2632 detects presence, position, and identity of a person Large touch-sensitive display 2620

Sound input 2610 /output 2614 hardware

The Magic Wall software supports:

Multimedia output compatible with current Web standards

Speech recognition

Tactile input

Intelligent agents representations in the form of speech-enabled animated characters The Magic Wall operates as follows:

1. If a user appears in the vicinity of Magic Wall, the sensor array triggers "user here" event that sends an environmental cue containing the person's id and the location to the Intelligent Agent Coordinator.
2. User is identified based on the information returned by the sensor array.
3. The Magic Wall switches to "locked on the user" mode. If another user approaches, the system will notify him or her that it cannot serve another user while the current user is being served.
4. Intelligent Agent Coordinator is notified about the user presence.
5. The Intelligent Agent Coordinator decides if there is pertinent to that user and Magic Wall location time-sensitive information to show (e.g. traffic report, meeting reminder). If such information exists, it is prepared for delivery. If not, control is transferred to the Information Prioritization Subsystem.
6. Information Prioritization Subsystem decides what information is most relevant to the user based on their personal profile, freshness of the information, and the Intelligent Agent Coordinator's prior suggestions.
7. The page of information identified as the most relevant to the user at this time and place is shown. The act of the information delivery can also include animation and speech output of the intelligent agent representation.
8. If user desires so, he or she can ask Magic Wall to show a particular page. The Magic Wall recognizes the speech fragment and then identifies and shows the requested page.
9. As the user departs from the Magic Wall area, the sensor array triggers "user left" event.
10. The Magic Wall switches back to the waiting state.

Other Clients

The Web client is a standard browser navigating to a set of Web pages which allow user to see the same information that is available via the Magic Wall.

The e-mail client is any standard e-mail program.

Intelligent Agent Coordinator Description

This piece of code is the coordinating agent (or meta-agent) for the Active Knowledge Management system. This means that all communications between the system and each user, as well as communication between the different minion agents are handled (coordinated) by the Intelligent Agent Coordinator. Examples of these minion agents are:

BackgroundFinder—an agent that parses meeting text determining important keywords and phrases and finds background information on the meeting for each user TrafficFinder—an agent that finds traffic information for each user based on where they live Several other agents that are responsible for doing statistical analysis of the data in each user's profile and updating fields pertinent to that data The Intelligent Agent Coordinator 2580 of FIG. 25 is also the user's "interface" to the system, in that whenever the user interacts with the system, regardless of the GUI or other end-user interface, they are ultimately dealing with (asking questions of or sending commands to) the Intelligent Agent Coordinator. The Intelligent Agent Coordinator has four primary responsibilities: 1) monitoring user activities, 2) handling information requests, 3) maintaining each user's profile, and 4) routing information to and from users and to and from the other respective agents.

Monitoring User Activities

Anytime a user triggers a sensor the Intelligent Agent Coordinator receives an "environmental cue." These cues not only enable the Intelligent Agent Coordinator to gain an understanding where users' are for information delivery purposes, but also to learn the standard patterns (arrival time, departure time, etc.) of each persons' life. These patterns are constantly being updated and refined in an attempt to increase the system's intelligence when delivering information. For instance, today it is not uncommon for a person to have several email accounts (work-based, home-based, mobile-based, etc.) as well as several different computers involved in the retrieval process for all of these accounts. Thus, for the Intelligent Agent Coordinator to be successful in delivering information to the correct location it must take into account all of these accounts and the times that the user is likely to be accessing them in order to maximize the probability that the user will see the information. This will be discussed further in another section.

Handling Information Requests

The Intelligent Agent Coordinator handles information requests from other agents in order to personalize information intended for each user and to more accurately reflect each user's interests in the information they are given. These requests will commonly be related to the user's profile. For instance, if an agent was preparing a traffic report for a user it may request the traffic region (search string) of that user from the Intelligent Agent Coordinator. All access to the user's profile data is accessed in this method.

Maintaining User Profiles

User profiles contain extensive information about the users. This information is a blend of user-specified data and information that the Intelligent Agent Coordinator has learned and extrapolated from each user's information and activities. In order to protect the data contained in the profiles, the Intelligent Agent Coordinator must handle all user information requests. The Intelligent Agent Coordinator is constantly modifying and updating these profiles by watching the user's activities and attempting to learn the patterns of their lives in order to assist in the more routine, mundane tasks. The Intelligent Agent Coordinator also employs other agents to glean meaning from each user's daily activities. These agents mine this data trying to discover indications of current interests, long-term interests, as well as time delivery preferences for each type of information. Another important aspect of the Intelligent Agent Coordinator's observations is that it also tries to determine where each user is physically located throughout the day for routing purposes.

Information Routing

Most people are mobile throughout their day. The Intelligent Agent Coordinator tries to be sensitive to this fact by attempting to determine, both by observation (unsupervised learning) and from cues from the environment, where users are or are likely to be located. This is certainly important for determining where to send the user's information, but also for determining in which format to send the information. For instance, if a user were at her desk and using the web client, the Intelligent Agent Coordinator would be receiving indications of activity from her PC and would know to send any necessary information there. In addition, because desktop PCs are generally quite powerful, a full-featured, graphically intense version could be sent. However, consider an alternative situation: the Intelligent Agent Coordinator has received an indication (via the keycard reader next to the exit) that you have just left the building. Minutes later the Intelligent Agent Coordinator also receives notification that you have received an urgent message. The Intelligent Agent Coordinator, knowing that you have left the building and having not received any other indications, assumes that you are reachable via your handheld device (for which it also knows the capabilities) and sends the text of the urgent message there, rather than a more graphically-oriented version.

Inherent Innovations

The Active Knowledge Management system represents some of the most advanced thinking in the world of knowledge management and human computer interaction. Some of the primary innovations include the following:

- The Intelligent Agent Coordinator as illustrated above.
- The development, demonstration, and realization of the theory of Intelligent Information Delivery
- Support for several channels of information delivery, all of which utilize a common back-end. For instance, if a user is in front of a Magic Wall the information will be presented in a multimedia-rich form. If the system determines that the user is mobile, the information will be sent by to their Awareness Machine in standard text. It facilitates delivery of information whenever and wherever a user requires the information.
- Personalization of information based not only on a static user profile, but also by taking into account history of the user interactions and current real-time situation including "who, where, and when" awareness.
- Utilization of fast and scalable Information Prioritization Subsystem that takes into account Intelligent Agents Coordinator opinion, user preferences, and history of user interactions. It takes the load of mundane decisions off the Intelligent Agents part therefore allowing the agents to be much more sophisticated and precise without compromising the system scalability.
- Speech recognition and speech synthesis in combination with intelligent agent animated representation and tactile input provides for efficient, intuitive, and emotionally rewarding interaction with the system.

Supporting Code in Accordance With A Preferred Embodiment

The following code is written and executed in the Microsoft Active Server Pages environment in accordance with a preferred embodiment. It consists primarily of Microsoft Jscript with some database calls embedded in the code to query and store information in the database.

Intention-Centric Interface

Create an Intention ASP Page ("intention_create.asp")

```
<%@ LANGUAGE = "JScript" %>
<%
Response.Buffer = true;
Response.Expires = 0;
%>
<html>
<head>
    <Title>Create An Intention</title>
</head>
<body bgcolor="#FFE9D%" style="font-family: Arial" text="#000000">
<%
//Define some variables
upl = Server.CreateObject("SoftArtisans.FileUp")
intention_name = upl.Form("intention_name")
intention_desc = upl.Form("intention_desc")
//intention_name = Request.Form("intention_name")
//intention_desc = Request.Form("intention_desc")
//intention_icon = Request.Form("intention_icon")
submitted = upl.Form("submitted")
items = new Enumerator(upl.Form)
%>
<%
//Establish connection to the database
objConnection = Server.CreateObject("ADODB.Connection")
objConnection.Open("Maelstrom")
%>
<%
//Check to see if the person hit the button and do the appropriate thing
if (submitted == "Add/Delete")
{
    flag = "false"
    //loop through all the inputs
    while(!items.atEnd( ))
    {
        i = items.item( )
        //if items are checked then delete them
        if(upl.Form(i) == "on")
        {
            objConnection.Execute("delete from user_intention where intention_id =" + i);
            objConnection.Execute("delete from intentions where intention_id ="
```

-continued

```
+ i);
            objConnection.Execute("delete from tools_to_intention where
intention_id =" + i)
            flag = "true"
        }
        items.moveNext ( )
    }
    // if items were not deleted then insert whatever is in the text field in the
database
    if(flag == "false")
    {
        intention_name_short = intention_name.replace(/ /gi, " ")
        objConnection.Execute("INSERT INTO intentions
(intention_name,intention_desc,intention_icon) values('" + intention_name + "', '" +
intention_desc + "', '" + intention_name_short + ".gif" + "')")
        Response.write("the intention short name is " + intention_name_short);
        upl.SaveAs("E:development/asp_examples/"+ intention_name_short +".gif")
    }
}
        // Query the database to show the most recent items.
        rsCustomersList = objConnection.Execute("SELECT * FROM intentions")
%>
<input type="Submit" name="return_to_mcp" value="Go to Main Control Panel"
onclick="location.href='default.asp'">
<form method="post" action="intention_create.asp" enctype="multipart/form-data" >
<TABLE border=0>
<tr><td colspan="2"><font face="Arial" size="+1"><b>Enter in a new
intention</b></font></td></tr>
<tr><td><font face="Arial">Name:</font></td> <td><INPUT TYPE="text"
name="intention_name"></td></tr>
<tr><td><font face="Arial">Description:</font></td><td><TEXTAREA
name="intention_desc"></TEXTAREA></td></tr>
<tr><td><font face="Arial">Icon Image:</font></td><td><INPUT TYPE="file"
NAME="intention_icon" size=40></td></tr>
<tr><td colspan="2"><INPUT type="submit" name="submitted" value="Add/Delete"></td></tr>
</TABLE>
<HR>
<font face="Arial" size="+1"><b>Current Intentions</b></font>
<TABLE>
    <tr bgcolor=E69780 align="center">
    <td>
        <FONT color="white">Delete</FONT>
    </td>
    <TD>
        <FONT color="white">Itention</FONT>
    </TD>
    <TD>
        <FONT color="white">Description</FONT>
    </TD>
    <TD>
        <FONT color="white">Image</FONT>
    </TD>
    </tr>
<%
// Loop over the intentions in the list
counter = 0;
while (!rsCustomersList.EOP)
{
%>
    <tr bgcolor="white" style="font-size: smaller">
        <td align=center>
            <INPUT type="checkbox" name="<%=rsCustomersList("intention_id")%>">
        </TD>
        <td>
            <%= rsCustomersList("intention_name")%>
        </td>
        <td>
            <%= rsCustomersList("intention_desc")%>
        </td>
        <td>
            <img src="../images/<%= rsCustomersList("intention_icon")%>">
        </td>
    </tr>
<%
counter++
rsCustomersList.MoveNext( )}
%>
</TABLE>
<hr>
```

-continued

```
Available Tools
</form>
</BODY>
</HTML>
```

Retrieve Intentions List ASP Page ("intentions_list.asp")

```
<!-- #include file="include/check_authentication.inc" -->
<HTML>
<HEAD>
    <TITLE>mySite! Intentions List</TITLE>
<SCRIPT LANGUAGE="JavaScript">
    function intentionsList ( ) {
        this internalArray = new Array ( );
        <%
        // establish connection to the database
        objConnection = Server.CreateObject("ADODB.Connection");
        objConnection.Open("Maelstrom");
        // create query
        intentionsQuery = objConnection.Execute("SELECT * FROM intentions ORDER BY
intention_name asc");
%>
        // write out the options
<%
        numOptions = 0
        while (!intentionsQuery.EOF) {
            intentionName = intentionsQuery("intention_name");
            intentionIcon = intentionsQuery("intention_icon");
%>
            this.internalArray[<%= numOptions%>] = new Array(2);
            this.internalArray[<%= numOptions%>] [0] = "<%= intentionName %>";
            this.internalArray[<%= numOptions%>] [1] = "images/<%= intentionIcon
%>";
<%          numOptions++; intentionsQuery.moveNext( );    %>
<%      }   %>
    }
    numIntentions = <%= numOptions%>;
    intentionArray = new intentionsList( ).internalArray;
    function selectIntention ( ) {
        for (i=0;i<numIntentions;i++) {
            if (IntentionsListSelect.options[i].selected) {
                intentionNameTextField.value = intentionArray[i] [0];
                //intentionPicture.src = intentionArray [i] [1];
                break;
            }
        }
    }
</SCRIPT>
</HEAD>
<BODY BGCOLOR="<%=Session("main_background")%>" style="font-family: Arial">
<CENTER>
<!--- <FORM NAME="intention_list"> --->
<TABLE FRAME="BOX" border=0 CELLPADDING="2" CELLSPACING="2">
<TR> <TD COLSPAN="3" STYLE="font: 20pt arial" ALIGN="CENTER"> <B>Add a mySite!
Intention</B> </TD> </TR>
<TR> <TD COLSPAN="3"> </TD> </TR>
<TR>
    <TD width="100"> <font size="-1">Please Select An Intention You Would Like to Add
to Your List</font> </TD>
    <TD colspan=2>
        <SELECT ID="(IntentionsListSelect" NAME="IntentionsListSelect" SIZE="10"
style="font: 9pt Arial;" onClick="selectIntention( ).">
        <%
        intentionsQuery.moveFirst( );
        for(j=0;j<numOptions;j++) { %>
            <OPTION VALUE="<%= intentionsQuery("intention_id") %>" <% if (j ==
0) { %> SELECTED <% } %>>
            <%= intentionsQuery("intention_name") %>
            <% intentionsQuery.moveNext( )
        }
        intentionsQuery.moveFirst( );
        %>
        </SELECT>
```

-continued

```
        </TD>
    </TR>
<TR> <TD COLSPAN="3"> </TD> </TR>
<TR>
        <TD width="100"> <font size="-1">Customize the Intention name</font></TD>
        <TD COLSPAN=2"> <INPUT TYPE="text" NAME="intentionNameTextField"
ID="intentionNameTextField" SIZE="30" VALUE="<%= intentionsQuery("intention_name")
%>"> </TD>
</TR>
<TR> <TD COLSPAN="3"> </TD> </TR>
<TR>
        <TD COLSPAN="3" ALIGN="CENTER">
            <INPUT TYPE="button" NAME="intentionOKButton" VALUE="     OK     " SIZE="10"
ID="intentionOKButton" onClick="javaScript:top.opener.top.navframe.addAnIntention( );">
                     &nbs
p;
            <INPUT TYPE="button" NAME="intentionCancelButton" VALUE="Cancel" SIZE="10"
ID="intentionCancelButton" onClick="self.close( );">
        </TD>
</TR>
</TABLE>
<!--- </FORM> --->
</CENTER>
<% objConnection.Close( ); %>
</BODY>
</HTML>
```

Display User Intention List ASP Page (excerpted from "navigation.asp")

```
<DIV ID="intentionlist" style="position: absolute; width:210; height:95; left: 365pt; top:
-5; visibility: hidden; font-family: Arial; font-color: #000000; font: 8pt Arial ; " >
<DIV style="position: absolute; top:7; left:7; height:78; width:210; z-index:2;
background: <%=Session("main_background")%>; border: solid 1pt #000000; padding: 3pt;
overflow: auto; alink: black; link: black;">
<body LINK="#000000" ALINK="#000000" vlink="black">
                <%
                // create query
                intentionsQuery = objConnection.Execute("SELECT user_intention.*
FROM user_intention, user_intention_to_persona WHERE
user_intention_to_persona.user_persona_id = " + Session("currentUserPersona") + " AND
user_intention_to_persona.user_intention_id = user_itention.user_intention_id" );
                numintentions = 0;
                Response.Write("<SCRIPT>numintentions=" +
intentionsQuery.RecordCount + "</SCRIPT><TABLE cellpadding='0' width='100%'
cellspacing='0'>");
                while (!intentionsQuery.EOF)
                {
                %>
                <TR><TD><a href="javascript:changeIntention('<%=
intentionsQuery("user_intention_id") %>','<%=numintentions%>')"
onmouseover="mouseOverTab( )" onmouseout="mouseOutOfTab( )"><font color="Black" face="arial"
size="-2"><%= intentionsQuery("intention_custom_name") %></font></a></TD><TD><IMG
align="right" SRC="images/delete.gif" alt="Delete this intention"
onClick="confirmDelete(<%= intentionsQuery("user_intention_id") %>)"></TD></TR>
                    <%numintentions++; intentionsQuery.moveNext( );     %>
                <%      }
                Response.Write("<SCRIPT>numintentions="+numintentions
+"</SCRIPT>");
                %>
                <tr><td colspan="2"><hr></td></tr>
                <TR><td colspan="2"><a href="javascript:changeIntention('add
. . .',<%=numintentions%>);" onmouseover="mouseOverTab( )"
onmouseout="mouseOutOfTab( )"><font color="Black" face="arial" size="-2">add
. . . </font></s></td></TR>
                </table>
</body>
</DIV>
<DIV style="position: absolute; top:0; left:-5; width: 230; height:105; z-index:1; "
```

-continued

```
onmouseout="intentionlist.style.visibility='hidden'"
onmouseout="intentionlist.style.visibility='hidden'"
onmouseover="intentionlist.style.visibility='hidden'"></DIV>
</DIV>
</DIV>
```

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for creating an information summary, comprising the steps of:

(a) obtaining a product identifier;
   (b) creating a query based on the product identifier;
   (c) querying a network of information utilizing a wireless communication medium, wherein the network is the Internet;
   (d) receiving the response to the query from the network of information;
   (e) displaying the information associated with the product identifier on a display;
   (f) ranking the information based on relevance to the product identifier; and
   g) wherein the information relates to at least one of features, shipping, and availability associated with the product, and the information is displayed to reflect a relationship between the information and a user profile.

2. A method for creating an information summary as recited in claim 1, including the step of parsing the response to the query for subsequent display based on predefined criteria.

3. A method for creating an information summary as recited in claim 1, including the step of providing constants that are utilized by the system for dynamically configuring the system based on current user inputs.

4. A method for creating an information summary as recited in claim 1, including the step of utilizing a universal product identifier code for the product identifier.

5. A method for creating an information summary as recited in claim 1, including the step of reducing the communication transmission rate to enhance the transmission quality over the wireless communication.

6. A method for creating an information summary as recited in claim 1, including support for querying the Internet to obtain pertinent information.

7. A method for creating an information summary as recited in claim 1, including optimizing the query for a particular search engine.

8. A method for creating an information summary as recited in claim 1, including the step of querying for alternative product identifiers to obtain additional pertinent information.

9. An apparatus that creates an information summary, comprising;

(a) a processor;
   (b) a memory that stores information under the control of the processor;
   (c) logic that obtains a product identifier;
   (d) logic that creates a query based on the product identifier;
   (e) logic that queries a network of information utilizing a wireless communication medium, wherein the network is the Internet;
   (f) logic that displays the information associated with the product identifier on a display;
   (g) logic that ranks the information based on relevance to the product identifier; and
   (h) wherein the information relates to at least one of features, shipping, and availability associated with the product, and the information is displayed to reflect a relationship between the information and a user profile.

10. A computer program embodied on a computer-readable medium that creates an information summary, comprising:

(a) a code segment that obtains a product identifier;
    (b) a code segment that creates a query based on the product identifier;
    (c) a code segment that queries a network of information utilizing a wireless communication medium, wherein the network is the Internet;
    (d) a code segment that displays the information associated with the product identifier on a display;
    (e) a code segment that ranks the information based on relevance to the product identifier; and
    (f) wherein the information relates to at least one of features, shipping and availability associated with the product, and the information is displayed to reflect a relationship between the information and a user profile.

11. A computer program embodied on a computer-readable medium that creates an information summary as recited in claim 10, including logic that parses the response to the query for subsequent display based on predetermined criteria.

12. A computer program embodied on a computer-readable medium that creates an information summary as recited in claim 10, including logic that modifies constants that are utilized by the system for dynamically configuring the system based on current user inputs.

13. A computer program embodied on a computer-readable medium that creates an information summary as recited in claim 10, including logic that reduces the communication transmission rate to enhance the transmission quality over the wireless communication.

14. A computer program embodied on a computer-readable medium that creates an information summary as recited in claim 10, including logic that recognizes patterns to enhance the location of pertinent information.

15. A computer program embodied on a computer-readable medium that creates an information summary as recited in claim 10, including logic that queries the Internet to obtain pertinent information.

16. A computer program embodied on a computer-readable medium that creates an information summary as recited in claim 10, including logic that optimizes the query for a particular search engine.

17. A computer program embodied on a computer-readable medium that creates an information summary as recited in claim 10, including the step of querying for alternative product identifiers to obtain additional pertinent information.

* * * * *

UNITED STATES PATENT AND TRADEMARK OFFICE
CERTIFICATE OF CORRECTION

PATENT NO. : 6,134,548
DATED : October 17, 2000
INVENTOR(S) : Edward Gottsman et al.

Page 1 of 1

It is certified that error appears in the above-identified patent and that said Letters Patent is hereby corrected as shown below:

Column 1,
Line 4, before "FIELD OF THE INVENTION", insert:

-- Specific Reference to Priority Application

This patent claims the benefit of U.S. Provisional Application Serial No. 60/110,817, filed Nov. 12, 1998, and titled "System, Method and Article of Manufacture for Advanced Mobile Bargain Shopping." --

Signed and Sealed this

Twenty-eighth Day of September, 2004

JON W. DUDAS
*Director of the United States Patent and Trademark Office*